(12) United States Patent
Nakai et al.

(10) Patent No.: US 9,936,176 B2
(45) Date of Patent: Apr. 3, 2018

(54) IMAGE PROTECTION DEVICE AND ADJUSTMENT METHOD

(71) Applicant: Mitsubishi Electric Corporation, Tokyo (JP)

(72) Inventors: Kenya Nakai, Tokyo (JP); Nobuo Takeshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 105 days.

(21) Appl. No.: 15/110,054

(22) PCT Filed: Jan. 7, 2015

(86) PCT No.: PCT/JP2015/050215
§ 371 (c)(1),
(2) Date: Jul. 6, 2016

(87) PCT Pub. No.: WO2015/105115
PCT Pub. Date: Jul. 16, 2015

(65) Prior Publication Data
US 2016/0330418 A1    Nov. 10, 2016

(30) Foreign Application Priority Data

Jan. 7, 2014   (JP) ................................ 2014-001057

(51) Int. Cl.
*G02B 26/08* (2006.01)
*H04N 9/31* (2006.01)
(Continued)

(52) U.S. Cl.
CPC ........... *H04N 9/3135* (2013.01); *G02B 26/10* (2013.01); *G02B 26/101* (2013.01);
(Continued)

(58) Field of Classification Search
CPC ..... G02B 26/10; G02B 26/101; G02B 26/105; G02B 26/123; G02B 26/127;
(Continued)

(56) References Cited

U.S. PATENT DOCUMENTS 8,067,725 B2    11/2011  Nishioka et al.
2011/0286067 A1*  11/2011  Iwamatsu ............ G02B 26/127
                                                    359/204.5
(Continued)

FOREIGN PATENT DOCUMENTS

EP    2 674 933 A1    12/2013
JP    2005-181831 A    7/2005
(Continued)

*Primary Examiner* — James Phan
(74) *Attorney, Agent, or Firm* — Birch, Stewart, Kolasch & Birch, LLP

(57) ABSTRACT

An image projection device includes: a light source for emitting a light beam; a mirror unit that includes a mirror for reflecting the beam and projects an image onto a surface by rotating the mirror about a rotational axis to scan the beam; and a controller for determining, according to a function representing a relationship between a shift amount, an emitting time of the beam, a position on the surface irradiated by the beam emitted at the emitting time, and a shift angle of the mirror from its position when it is not driven, the emitting time corresponding to a target position. The shift amount is a shift amount of a position of the beam incident on the mirror or a shift amount of a position of the source relative to an optical axis of light incident on the mirror without the shift amount and perpendicularly intersecting the rotational axis.

20 Claims, 13 Drawing Sheets

(51) Int. Cl.
*G09G 3/02* (2006.01)
*G09G 5/395* (2006.01)
*G02B 26/10* (2006.01)
*G02B 27/10* (2006.01)
*G02B 27/30* (2006.01)
*G09G 3/20* (2006.01)
*G09G 3/34* (2006.01)
*G02B 26/12* (2006.01)

(52) U.S. Cl.
CPC ......... *G02B 26/105* (2013.01); *G02B 27/104* (2013.01); *G02B 27/30* (2013.01); *G09G 3/025* (2013.01); *G09G 5/395* (2013.01); *H04N 9/317* (2013.01); *H04N 9/3155* (2013.01); *H04N 9/3164* (2013.01); *G02B 26/123* (2013.01); *G02B 26/127* (2013.01); *G09G 3/2003* (2013.01); *G09G 3/346* (2013.01); *G09G 2320/08* (2013.01)

(58) Field of Classification Search
CPC .... G02B 27/104; G02B 27/30; H04N 9/3135; H04N 9/3155; H04N 9/3164; H04N 9/317; G09G 3/025; G09G 5/395; G09G 3/2003; G09G 3/346; G09G 2320/08
USPC ........................................ 359/196.1–226.2
See application file for complete search history.

(56) References Cited

U.S. PATENT DOCUMENTS

2012/0127184 A1  5/2012  Satoh et al.
2014/0185021 A1  7/2014  Yamagiwa

FOREIGN PATENT DOCUMENTS

| JP | 2007-520742 A | 7/2007 |
| JP | 2010-26443 A | 2/2010 |
| JP | 2011-28065 A | 2/2011 |
| JP | 2011-39326 A | 2/2011 |
| JP | 4897941 B1 | 3/2012 |
| JP | 2012-124880 A | 6/2012 |
| JP | 5167992 B2 | 3/2013 |
| JP | 2014-126723 A | 7/2014 |
| WO | WO 2005/067311 A1 | 7/2005 |

\* cited by examiner

IMAGE PROTECTION DEVICE AND ADJUSTMENT METHOD

TECHNICAL FIELD

The present invention relates to an image projection device, and an adjustment method and control method for an image projection device.

BACKGROUND ART

As devices for scanning light beams, optical scanning devices using a polygon mirror or Galvano mirror have been widely used. Optical scanning devices using a Micro Electro Mechanical Systems (MEMS) mirror device manufactured by using MEMS techniques have also been proposed. The MEMS mirror device is a device that reciprocates, by electromagnetic force, electrostatic force, or the like, a scanning mirror in which components such as an elastic member are integrally molded using silicon or the like, and is a micro-electromechanical component capable of scanning a light beam.

Patent Reference 1 proposes a technique of, in an image display device that displays an image on a screen by scanning multiple laser lights by means of an MEMS mirror device, detecting an optical axis shift of the multiple laser lights by using a light receiving element.

Further, Patent Reference 2 proposes a technique of, in an image display device that projects an image on a screen by scanning multiple laser lights by means of a scanner mirror, detecting a shift of an optical axis of a light source by using a photoreceptor and correcting an emitting time of laser light based on the detected shift.

PRIOR ART REFERENCES

Patent References

Patent Reference 1: Japanese Patent No. 4897941
Patent Reference 2: Japanese Patent No. 5167992

SUMMARY OF THE INVENTION

Problems to be Solved by the Invention

However, in Patent Reference 2, a relationship between a shift of an optical axis, an emitting time of laser light, an irradiation position on the screen irradiated by laser light is not taken into account, so it is not possible to irradiate an accurate position on the screen with laser light. Thus, for example, when one pixel is formed by multiple laser lights, the irradiation positions of the multiple laser lights on the screen do not coincide with each other and the pixel displayed on the screen 30 is blurred.

Further, Patent References 1 and 2 employ a configuration in which a special light receiving element or photoreceptor is added to detect an optical axis shift of laser light, which increases the cost of the device.

An object of the present invention is to provide an image projection device, and an adjustment method and control method for an image projection device capable of irradiating an accurate position on a projection surface with a light beam emitted from a light source without adding a light receiving element for detecting a shift of an optical axis.

Means for Solving the Problems

An image projection device according to the present invention includes: a light source for emitting a light beam; a scanning mirror unit including a scanning mirror for reflecting the light beam emitted from the light source, the scanning mirror unit projecting an image onto a projection surface by driving the scanning mirror to scan the light beam; and a controller for controlling an emitting time of the light beam from the light source, the controller determining, according to a function representing a relationship between a positional shift amount of the light beam relative to the scanning mirror, an emitting time of the light beam from the light source, and an irradiation position on the projection surface irradiated by the light beam emitted from the light source at the emitting time, from a previously obtained value of the positional shift amount and a target irradiation position on the projection surface to be irradiated by the light beam from the light source, the emitting time of the light beam corresponding to the target irradiation position. The scanning mirror unit scans the light beam by rotating the scanning mirror about a rotational axis. The light beam from the light source is incident on the scanning mirror from a direction parallel to a reference optical axis perpendicularly intersecting the rotational axis. The positional shift amount is a positional shift amount of an optical axis of the light beam incident on the scanning mirror from the reference optical axis in a direction perpendicular to the rotational axis and the reference optical axis. As viewed from the rotational axis direction: the scanning mirror unit scans the light beam over the projection surface in a scanning direction parallel to the reference optical axis, an angle formed by a normal to the scanning mirror when the scanning mirror is not driven and the reference optical axis is 45 degrees, and the function is represented by $$X=(S-D)\cdot\tan(2\cdot\theta(t))+D/\tan(45-\theta(t))$$

where S is a distance from the rotational axis to the projection surface, D is the positional shift amount, t is the emitting time of the light beam from the light source, $\theta(t)$ is a rotational angle of the scanning mirror at the emitting time t from a rotational position of the scanning mirror when the scanning mirror is not driven, and X is the irradiation position on the projection surface in the scanning direction irradiated by the light beam emitted at the emitting time t.

An image projection device according to the present invention includes: a light source for emitting a light beam; a scanning mirror unit including a scanning mirror for reflecting the light beam emitted from the light source, the scanning mirror unit projecting an image onto a projection surface by driving the scanning mirror to scan the light beam; a collimator lens disposed between the light source and the scanning mirror, the collimator lens converting a divergence angle of the light beam emitted from the light source; and a controller for controlling an emitting time of the light beam from the light source, the controller determining, according to a function representing a relationship between a positional shift amount of the light source relative to the scanning mirror, an emitting time of the light beam from the light source, and an irradiation position on the projection surface irradiated by the light beam emitted from the light source at the emitting time, from a previously obtained value of the positional shift amount and a target irradiation position on the projection surface to be irradiated by the light beam from the light source, the emitting time of the light beam corresponding to the target irradiation position. The scanning mirror unit scans the light beam by rotating the scanning mirror about a rotational axis. The collimator lens has an optical axis coinciding with a reference optical axis perpendicularly intersecting the rotational axis. The positional shift amount is a positional shift amount of the light source from the reference optical axis in a direction perpendicular to the rotational axis and the reference optical axis. As viewed from the rotational axis direction: the scanning mirror unit scans the light beam over the projection surface in a scanning direction parallel to the reference optical axis, an angle formed by a normal to the scanning mirror when the scanning mirror is not driven and the reference optical axis is 45 degrees, and the function is represented by $$X=(S-(L \cdot \tan(\tan^{-1}(Ds/F))-Ds)) \cdot \tan(2 \cdot \theta(t)+\theta(t)+\tan^{-1}(Ds/F))+(L \cdot \tan(\tan^{-1}(Ds/F))-Ds)/\tan(45-\theta(t))$$

where S is a distance from the rotational axis to the projection surface, Ds is the positional shift amount, t is the emitting time of the light beam from the light source, $\theta(t)$ is a rotational angle of the scanning mirror at the emitting time t from a rotational position of the scanning mirror when the scanning mirror is not driven, L is a distance between the rotational axis and the light source in a direction parallel to the reference optical axis, F is a distance between the collimator lens and the light source in the direction parallel to the reference optical axis, and X is the irradiation position on the projection surface in the scanning direction irradiated by the light beam emitted at the emitting time t.

An image projection device according to the present invention includes: a light source for emitting a light beam; a scanning mirror unit including a scanning mirror for reflecting the light beam emitted from the light source, the scanning mirror unit projecting an image onto a projection surface by driving the scanning mirror to scan the light beam; and a controller for controlling an emitting time of the light beam from the light source, the controller determining, according to a function representing a relationship between a positional shift amount of the light beam or the light source relative to the scanning mirror, an emitting time of the light beam from the light source, and an irradiation position on the projection surface irradiated by the light beam emitted from the light source at the emitting time, from a previously obtained value of the positional shift amount and a target irradiation position on the projection surface to be irradiated by the light beam from the light source, the emitting time of the light beam corresponding to the target irradiation position. The controller receives an image signal representing a projection target image to be projected on the projection surface, causes, based on the image signal, the light source to emit the light beam corresponding to each of pixels of the projection target image, and determines the emitting time of the light beam corresponding to each of the pixels with a position on the projection surface of each of the pixels as the target irradiation position. The scanning mirror unit scans the light beam by rotating the scanning mirror about a rotational axis. The function represents a relationship between the positional shift amount, the emitting time, the irradiation position, and a shift angle of the scanning mirror from a predetermined reference rotational position. The controller determines, according to the function, from a previously obtained value of the positional shift amount, a previously obtained value of the shift angle, and the target irradiation position, the emitting time of the light beam corresponding to the target irradiation position.

An image projection device according to the present invention includes: a light source unit including a plurality of light sources for emitting light beams having different wavelengths; a scanning mirror unit including a scanning mirror for reflecting the light beam emitted from each of the light sources, the scanning mirror unit projecting an image onto a projection surface by driving the scanning mirror to scan the light beam from each of the light sources; and a controller for controlling an emitting time of the light beam from each of the light sources, the controller determining, for each of the light sources, according to a function representing a relationship between a positional shift amount of the light beam from the light source or the light source relative to the scanning mirror, an emitting time of the light beam from the light source, and an irradiation position on the projection surface irradiated by the light beam emitted from the light source at the emitting time, from a previously obtained value of the positional shift amount and a target irradiation position on the projection surface to be irradiated by the light beam from the light source, the emitting time of the light beam corresponding to the target irradiation position. The scanning mirror unit scans the light beam from each of the light sources by rotating the scanning mirror about a rotational axis. The function represents a relationship between the positional shift amount, the emitting time, the irradiation position, and a shift angle of the scanning mirror from a predetermined reference rotational position. The controller determines, for each of the light sources, according to the function, from a previously obtained value of the positional shift amount, a previously obtained value of the shift angle, and the target irradiation position, the emitting time of the light beam corresponding to the target irradiation position.

An image projection device according to the present invention includes: a light source unit including first and second light sources for emitting light beams having different wavelengths; a scanning mirror unit including a scanning mirror for reflecting the light beam emitted from each of the light sources, the scanning mirror unit projecting an image onto a projection surface by driving the scanning mirror to scan the light beam from each of the light sources; a controller for controlling an emitting time of the light beam from each of the light sources, the controller determining, according to a first function representing a relationship between an emitting time of the light beam from the first light source and an irradiation position on the projection surface irradiated by the light beam emitted from the first light source at the emitting time, from a target irradiation position on the projection surface to be irradiated by the light beam from the first light source, the emitting time of the light beam from the first light source corresponding to the target irradiation position, the controller determining, according to a second function representing a relationship between a positional shift amount of the light beam from the second light source or the second light source relative to the scanning mirror, an emitting time of the light beam from the second light source, and an irradiation position on the projection surface irradiated by the light beam emitted from the second light source at the emitting time, by using an adjustable parameter value as the positional shift amount, from a target irradiation position on the projection surface to be irradiated by the light beam from the second light source, the emitting time of the light beam from the second light source corresponding to the target irradiation position; and an adjustment unit for adjusting the parameter value used by the controller.

An adjustment method for an image projection device according to the present invention is an adjustment method for an image projection device including: a light source unit including first and second light sources for emitting light beams having different wavelengths; a scanning mirror unit including a scanning mirror for reflecting the light beam emitted from each of the light sources, the scanning mirror unit projecting an image onto a projection surface by driving the scanning mirror to scan the light beam from each of the light sources; and a controller for controlling an emitting time of the light beam from each of the light sources, the controller determining, according to a first function representing a relationship between an emitting time of the light beam from the first light source and an irradiation position on the projection surface irradiated by the light beam emitted from the first light source at the emitting time, from a target irradiation position on the projection surface to be irradiated by the light beam from the first light source, the emitting time of the light beam from the first light source corresponding to the target irradiation position, the controller determining, according to a second function representing a relationship between a positional shift amount of the light beam from the second light source or the second light source relative to the scanning mirror, an emitting time of the light beam from the second light source, and an irradiation position on the projection surface irradiated by the light beam emitted from the second light source at the emitting time, by using an adjustable parameter value as the positional shift amount, from a target irradiation position on the projection surface to be irradiated by the light beam from the second light source, the emitting time of the light beam from the second light source corresponding to the target irradiation position, the adjustment method including: an emission step of causing, by the controller, the first and second light sources to emit the light beams corresponding to a same target irradiation position on the projection surface; and an adjustment step of adjusting the parameter value so that an irradiation position on the projection surface irradiated by the light beam from the second light source coincides with an irradiation position on the projection surface irradiated by the light beam from the first light source.

A control method for an image projection device according to the present invention is a control method for an image projection device including: a light source for emitting a light beam; and a scanning mirror unit including a scanning mirror for reflecting the light beam emitted from the light source, the scanning mirror projecting an image onto a projection surface by driving the scanning mirror to scan the light beam, the control method including: a control step of controlling an emitting time of the light beam from the light source, the control step determining, according to a function representing a relationship between a positional shift amount of the light beam or the light source relative to the scanning mirror, an emitting time of the light beam from the light source, and an irradiation position on the projection surface irradiated by the light beam emitted from the light source at the emitting time, from a previously obtained value of the positional shift amount and a target irradiation position on the projection surface to be irradiated by the light beam from the light source, the emitting time of the light beam corresponding to the target irradiation position.

A control method for an image projection device according to the present invention is a control method for an image projection device including: a light source unit including a plurality of light sources for emitting light beams having different wavelengths; and a scanning mirror unit including a scanning mirror for reflecting the light beam emitted from each of the light sources, the scanning mirror unit projecting an image onto a projection surface by driving the scanning mirror to scan the light beam from each of the light sources, the control method including: a control step of controlling an emitting time of the light beam from each of the light sources, the control step determining, for each of the light sources, according to a function representing a relationship between a positional shift amount of the light beam from the light source or the light source relative to the scanning mirror, an emitting time of the light beam from the light source, and an irradiation position on the projection surface irradiated by the light beam emitted from the light source at the emitting time, from a previously obtained value of the positional shift amount and a target irradiation position on the projection surface to be irradiated by the light beam from the light source, the emitting time of the light beam corresponding to the target irradiation position.

A control method for an image projection device according to the present invention is a control method for an image projection device including: a light source unit including first and second light sources for emitting light beams having different wavelengths; and a scanning mirror unit including a scanning mirror for reflecting the light beam emitted from each of the light sources, the scanning mirror unit projecting an image onto a projection surface by driving the scanning mirror to scan the light beam from each of the light sources, the control method including: a control step of controlling an emitting time of the light beam from each of the light sources, the control step determining, according to a first function representing a relationship between an emitting time of the light beam from the first light source and an irradiation position on the projection surface irradiated by the light beam emitted from the first light source at the emitting time, from a target irradiation position on the projection surface to be irradiated by the light beam from the first light source, the emitting time of the light beam from the first light source corresponding to the target irradiation position, the control step determining, according to a second function representing a relationship between a positional shift amount of the light beam from the second light source or the second light source relative to the scanning mirror, an emitting time of the light beam from the second light source, and an irradiation position on the projection surface irradiated by the light beam emitted from the second light source at the emitting time, by using an adjustable parameter value as the positional shift amount, from a target irradiation position on the projection surface to be irradiated by the light beam from the second light source, the emitting time of the light beam from the second light source corresponding to the target irradiation position; and an adjustment step of adjusting the parameter value used in the control step.

Effect of the Invention

According to the present invention, it is possible to irradiate an accurate position on a projection surface with a light beam emitted from a light source.

MODES FOR CARRYING OUT THE INVENTION

Embodiments of the present invention will be described below with reference to the drawings.

First Embodiment

Figure 1:
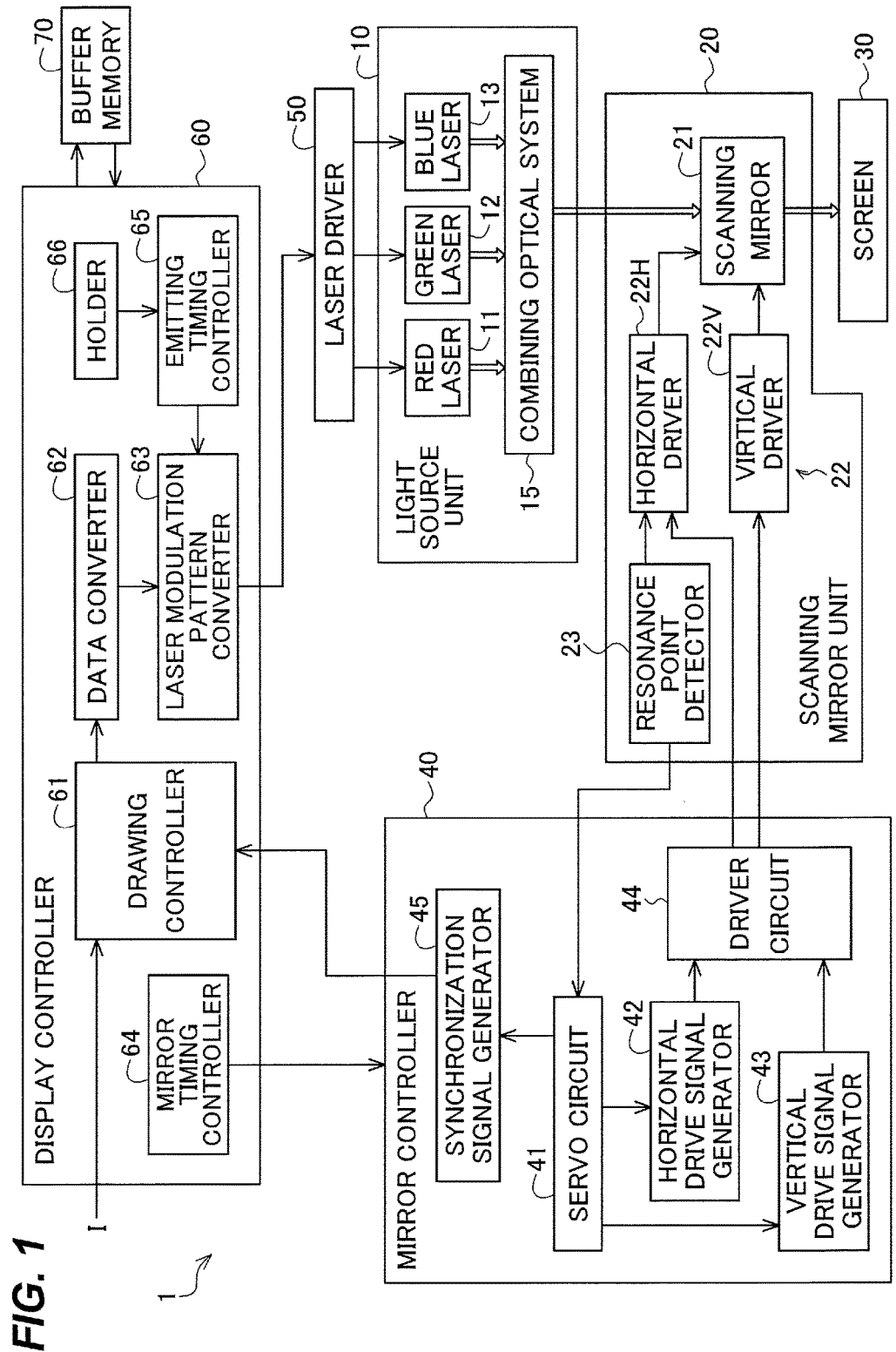
FIG. 1 is a block diagram schematically illustrating a configuration of an image projection device according to a first embodiment.

FIG. 1 is a block diagram schematically illustrating a configuration of an image projection device 1 according to a first embodiment. The image projection device 1 is a device that projects an image onto a projection surface by raster scanning light beams over the projection surface based on an input image signal I. The image projection device 1 is, for example, a rear-projection television that projects light from behind a transmissive screen to display an image. However, the image projection device 1 is not limited to this, and may be a front projector, a head-up display, a head mount display, a projection mapping device, or the like.

In FIG. 1, the image projection device 1 includes a light source unit 10, a scanning mirror unit 20, and a display controller 60. The image projection device 1 may also include a screen 30, a mirror controller 40, a laser driver 50, and a buffer memory 70. The light source unit 10 includes light sources 11, 12, and 13 that emit light beams. The light source unit 10 may include a combining optical system 15 when there are multiple light sources 11, 12, and 13, for example. The scanning mirror unit 20 includes a scanning mirror 21. The scanning mirror unit 20 may also include a horizontal driver 22H, a vertical driver 22V, or a resonance point detector 23. The display controller 60 includes an emitting time determiner 65. The display controller 60 may also include a drawing controller 61, a data converter 62, a laser modulation pattern converter 63, a mirror timing controller 64, or a holder 66.

The light source unit 10 includes, for example, multiple light sources that emit light beams having different wavelengths. Here, the light source unit 10 includes the red laser 11, green laser 12, and blue laser 13 that each emit laser light as a light beam. The red laser 11, green laser 12, and blue laser 13 respectively emit red, green, and blue light beams in accordance with drive signals supplied from the laser driver 50.

The light source unit 10 also includes the combining optical system 15, which combines light beams of the respective colors emitted from the red laser 11, green laser 12, and blue laser 13 to form and output a single light beam (or a ray of laser light). The light beam output from the combining optical system 15 is emitted to the scanning mirror unit 20 through a mirror, a prism, a diffraction grating, a lens, or the like as an optical path changing member.

The member for guiding the light beam from the combining optical system 15 to the scanning mirror unit 20 is not limited to the above, and may be, for example, an optical fiber. Further, without using the optical path changing member, the combining optical system 15 may be arranged so that the light beam from the combining optical system 15 is directly guided to the scanning mirror unit 20.

The scanning mirror unit 20 is a device that scans light beams incident from the combining optical system 15. Here, the scanning mirror unit 20 is an MEMS mirror device. In FIG. 1, the scanning mirror unit 20 includes the scanning mirror 21, a driver 22, and the resonance point detector 23.

The scanning mirror 21 reflects light beams from the combining optical system 15. In FIG. 1, the scanning mirror 21 reflects light beams of the respective colors emitted from the red laser 11, green laser 12, and blue laser 13.

The driver 22 drives the scanning mirror 21 to scan the light beams of the respective colors. The driver 22 then projects an image onto the screen 30.

Specifically, the driver 22 drives the scanning mirror 21 to turn the scanning mirror 21. Thereby, the driver 22 scans the light beams emitted from the combining optical system 15 over the screen 30 and forms a display screen by the laser light on the screen 30.

The driver 22 scans the light beams over the screen 30 in a horizontal scanning direction (first scanning direction) and a vertical scanning direction (second scanning direction) perpendicular to each other. In FIG. 1, the driver 22 includes the horizontal driver 22H and vertical driver 22V. The horizontal driver 22H drives the scanning mirror 21 to scan the light beams in the horizontal scanning direction. The vertical driver 22V drives the scanning mirror 21 to scan the light beams in the vertical scanning direction. Under control of the mirror controller 40, the horizontal driver 22H and vertical driver 22V cause the scanning mirror 21 to operate so that the light beams are raster scanned over the screen 30. At this time, the horizontal driver 22H resonantly drives the scanning mirror 21.

The resonance point detector 23 detects a resonant state of the horizontal driver 22H and supplies a detection signal indicating the result of the detection to the mirror controller 40.

The screen 30 is a projection surface or image display surface onto which an image is projected by irradiation with light beams from the scanning mirror 21. The screen 30 may be a projection member or image display member having a projection surface or image display surface.

The mirror controller 40 controls the scanning mirror unit 20. The mirror controller 40 includes, for example, a servo circuit 41, a horizontal drive signal generator 42, a vertical drive signal generator 43, a driver circuit 44, and a synchronization signal generator 45.

The servo circuit 41 controls the operation of the horizontal drive signal generator 42 and vertical drive signal generator 43 based on the detection signal supplied from the resonance point detector 23 of the scanning mirror unit 20. The servo circuit 41 controls the horizontal drive signal generator 42 and vertical drive signal generator 43 so that light beams are raster scanned over the screen 30.

Under control of the servo circuit 41, the horizontal drive signal generator 42 generates a horizontal drive signal for driving the horizontal driver 22H and outputs it to the driver circuit 44.

Under control of the servo circuit 41, the vertical drive signal generator 43 generates a vertical drive signal for driving the vertical driver 22V and outputs it to the driver circuit 44.

The driver circuit 44 amplifies the horizontal drive signal from the horizontal drive signal generator 42 to a predetermined level and supplies it to the horizontal driver 22H. The driver circuit 44 also amplifies the vertical drive signal from the vertical drive signal generator 43 to a predetermined level and supplies it to the vertical driver 22V.

The synchronization signal generator 45 generates a synchronization signal based on the drive signals (horizontal drive signal and vertical drive signal) for the scanning mirror 21 controlled by the servo circuit 41. The synchronization signal generator 45 supplies the generated synchronization signal to the display controller 60.

The laser driver 50 is a light source driver that drives the light sources 11, 12, and 13 included in the light source unit 10. The laser driver 50 generates, based on the drive signals representing light emitting patterns of the lasers of the respective colors supplied from the display controller 60, drive signals for driving the red laser 11, green laser 12, and blue laser 13. The laser driver 50 supplies the red laser 11, green laser 12, and blue laser 13 with the respective generated drive signals.

The display controller 60 controls emission of light beams or light emission from the light source unit 10 in accordance with an input image signal I. Specifically, the display controller 60 receives an image signal I representing a projection target image to be projected onto the screen 30, for example. Then, based on the image signal I, the display controller 60 causes the laser of each color to emit a light beam of each color corresponding to each of pixels of the projection target image. "Projection target image" refers to an image to be projected onto the screen 30. More specifically, the projection target image consists of multiple pixels arranged in two directions corresponding to the horizontal scanning direction and vertical scanning direction. The image signal I indicates a grayscale value for each color of each pixel constituting the projection target image. For each color, in accordance with the grayscale value for each pixel of the projection target image, the display controller 60 causes the laser to emit a light beam for forming each pixel.

The input image signal I should be a signal in a format processable by the display controller 60. The image signal I is supplied from, for example, a device (e.g., a broadcast receiver or a television receiver) having a function of receiving a broadcast wave; or the image signal I is supplied from, for example, a device (e.g., an optical disk player, a car navigation device, or a gaming machine) having a playback function of reading an image signal from an information recording medium, such as an optical disk or hard disk; or the image signal I is supplied from, for example, an information processing device (e.g., personal computer) that downloads image information via a network (e.g., the Internet).

The display controller 60 controls, by using the synchronization signal supplied from the synchronization signal generator 45, emission of light beams from the light source unit 10 so that it is synchronized with the operation of the scanning mirror 21. Specifically, for example, the display controller 60 controls an emitting time of a light beam of each color for each pixel based on the synchronization signal so that the light beam of each color corresponding to each pixel emitted from the light source unit 10 irradiates a position on the screen 30 at which each pixel is to be formed.

The display controller 60 temporarily stores image data corresponding to the input image signal I or converted data obtained by converting the image data in the buffer memory 70.

In FIG. 1, the display controller 60 includes, for example, the drawing controller 61, data converter 62, laser modulation pattern converter 63, and mirror timing controller 64.

The drawing controller 61 reads the image data stored in the buffer memory 70. The drawing controller 61 then supplies the read image data to the data converter 62.

The data converter 62 converts the image data supplied from the drawing controller 61 into bit data. The data converter 62 then supplies the laser modulation pattern converter 63 with the image data converted into the bit data.

The laser modulation pattern converter 63 converts the bit data supplied from the data converter 62 into drive signals representing light emitting patterns of the lasers. The laser modulation pattern converter 63 then supplies the converted drive signals to the laser driver 50. Specifically, for each color, the laser modulation pattern converter 63 generates, based on the bit data, a drive signal corresponding to the grayscale value of each pixel, for example. The laser modulation pattern converter 63 then supplies, based on the synchronization signal, the drive signals for each pixel to the laser driver 50, pixel by pixel, in the order of the raster scanning.

The mirror timing controller 64 controls timing for controlling the scanning mirror 21.

In the above configuration, the light source unit 10, scanning mirror unit 20, and screen 30 constitute a light beam scanning optical system 80.

Figure 2:
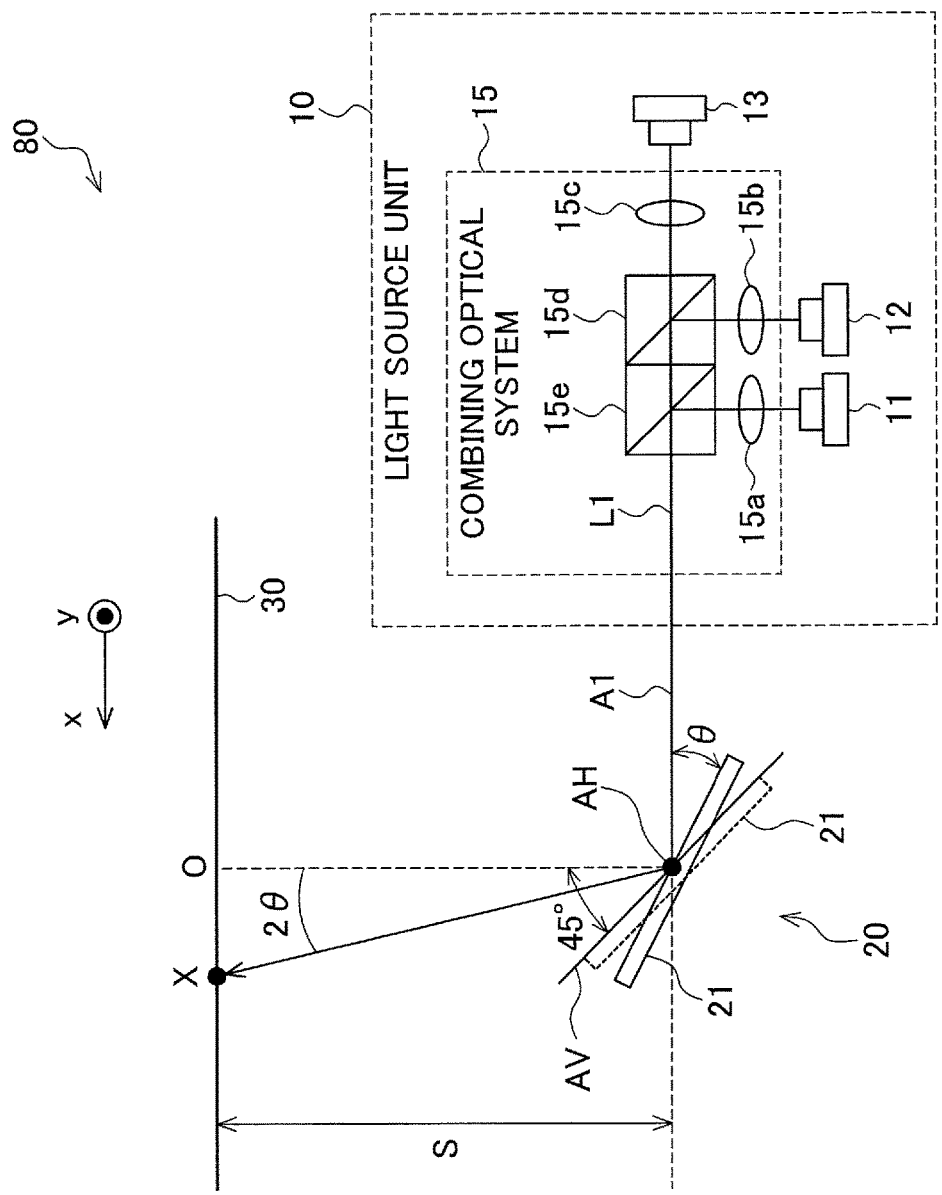
FIG. 2 is a diagram schematically illustrating a light beam scanning optical system in the first embodiment.

FIG. 2 is a diagram schematically illustrating the light beam scanning optical system 80. A relationship between emitting times of light beams from the light source unit 10 and irradiation positions on the screen 30 will be described below using FIG. 2. In the following description, a left-right direction on the drawing sheet of FIG. 2 will be referred to as the "horizontal direction" and a direction perpendicular to the drawing sheet of FIG. 2 will be referred to as the "vertical direction."

In FIG. 2, the combining optical system 15 of the light source unit 10 includes collimator lenses 15a, 15b, and 15c and wavelength selective prisms 15d and 15e. The collimator lenses 15a, 15b, and 15c respectively convert divergence angles of light beams emitted from the red laser 11, green laser 12, and blue laser 13.

That is, the collimator lens 15a converts a divergence angle of a light beam emitted from the red laser 11; the collimator lens 15b converts a divergence angle of a light beam emitted from the green laser 12; the collimator lens 15c converts a divergence angle of a light beam emitted from the blue laser 13.

The wavelength selective prism 15d has an optical surface that transmits a blue light beam from the collimator lens 15c and reflects a green light beam from the collimator lens 15b. The wavelength selective prism 15e has an optical surface that transmits blue and green light beams from the wavelength selective prism 15d and reflects a red light beam from the collimator lens 15a.

The components of the light source unit 10 are configured so that red, green, and blue light beams emitted from the red laser 11, green laser 12, and blue laser 13 are combined by the combining optical system 15 on the same optical axis A1 into a single light beam L1. Here, the optical axis A1 extends in the horizontal direction.

The scanning mirror 21 of the scanning mirror unit 20 is disposed rotatably about a rotational axis (or rotational drive axis) AH. Here, the rotational axis AH extends in the vertical direction.

The scanning mirror 21 and light source unit 10 are arranged so that the light beam L1 is incident on the rotational axis AH; or the scanning mirror 21 and light source unit 10 are arranged so that the optical axis A1 perpendicularly intersects the rotational axis AH.

The optical axis A1 is an ideal optical axis incident on the scanning mirror 21. The optical axis A1 will be referred to below as the "reference optical axis A1."

The scanning mirror 21 is also disposed rotatably about a rotational axis (or rotational drive axis) AV perpendicularly intersecting the rotational axis AH. The scanning mirror 21 and light source unit 10 are arranged so that the light beam L1 is incident on the rotational axis AV.

The screen 30 is disposed a distance S away from the rotational axis AH of the scanning mirror 21 and parallel to the reference optical axis A1. The screen 30 is also disposed parallel to the rotational axis AH. The screen 30 extends in the horizontal direction and vertical direction. The screen 30 is a surface including an axis in the horizontal direction and an axis in the vertical direction.

In the above configuration, the light beam L1 from the light source unit 10 is incident on the scanning mirror 21 of the scanning mirror unit 20. The light beam L1 incident on the scanning mirror 21 is then deflected by the scanning mirror 21 in a direction toward the screen 30. The deflected light beam L1 then irradiates the screen 30.

The scanning mirror unit 20 scans the light beam L1 over the screen 30 by rotating the scanning mirror 21 about the rotational axes AH and AV.

Specifically, the scanning mirror unit 20 scans the light beam L1 over the screen 30 in the horizontal scanning direction parallel to the reference optical axis A1 by rotating the scanning mirror 21 about the rotational axis AH, for example. The scanning mirror unit 20 also scans the light beam L1 over the screen 30 in the vertical scanning direction perpendicular to the horizontal scanning direction by rotating the scanning mirror 21 about the rotational axis AV, for example.

Here, the horizontal scanning direction and vertical scanning direction respectively extend in the horizontal direction and vertical direction. The scanning mirror unit 20 rotates the scanning mirror 21 about the rotational axes AH and AV to control tilt of the scanning mirror 21. Thereby, the scanning mirror unit 20 performs raster scanning of the light beam L1 irradiating the screen 30.

The scanning mirror 21 is disposed so that when the scanning mirror 21 is not driven, an angle formed by a normal to the scanning mirror 21 and the reference optical axis A1 is 45 degrees, as indicated by a dashed line in FIG. 2. The rotational position of the scanning mirror 21 when the scanning mirror 21 is not driven will be referred to below as the "initial rotational position." When the scanning mirror 21 is at the initial rotational position, the light beam L1 is incident on the scanning mirror 21 at an incident angle of 45 degrees. The light beam L1 is then deflected in a direction (upward direction on the drawing sheet of FIG. 2) 90 degrees from the reference optical axis A1 about the rotational axis AH. The light beam L1 then irradiates a position O on the screen 30. This irradiation position O of the light beam L1 on the screen 30 is taken as a reference position.

Here, an x axis is defined in the horizontal scanning direction (or horizontal direction), a y axis is defined in the vertical scanning direction (or vertical direction), and a position on the screen 30 is represented by coordinates (x, y). The reference position O is taken as the origin (0, 0).

An irradiation position of a light beam in the horizontal scanning direction will be described below with the light beam scanning optical system 80 of FIG. 2 viewed from the rotational axis AH direction.

The scanning mirror 21 is driven to reciprocate about the rotational axis AH within a predetermined angular range. A rotational angle θ(t) is a rotational angle of the scanning mirror 21 at a time t from the initial rotational position about the rotational axis AH. In the first embodiment, the rotational angle θ(t) is represented by the following equation (1). The rotational angle is also referred to as a displacement angle or drive angle.

$$\theta(t) = \theta a \cdot \sin(2\pi \cdot fh \cdot t) \tag{1}$$

In the above equation (1), θa denotes an amplitude of the rotational angle; fh denotes a frequency of the reciprocating motion of the scanning mirror 21 about the rotational axis AH. Specifically, fh is a horizontal scanning frequency when the scanning mirror 21 is driven in the raster scanning. At time t=0, the scanning mirror 21 is at a rotational position at a center of its reciprocating motion. In the following description, θ(t) will be denoted simply by θ.

X is an irradiation position (position of a scanning point) on the screen 30 in the horizontal scanning direction irradiated by a light beam emitted from a laser (light source 11, 12, or 13) at a time t. When the rotational angle θ is given by the above equation (1), X is represented by the following equation (2).

$$X = S \cdot \tan(2 \cdot \theta) = S \cdot \tan(2 \cdot \theta a \cdot \sin(2\pi \cdot fh \cdot t)) \tag{2}$$

An irradiation position $X_i$ is an irradiation position of an i-th emitted light beam on the screen. If the laser (light source 11, 12, or 13) is caused to emit light at regular time intervals of Δt, the irradiation position $X_i$ is represented by the following equation (3). Here, i is an integer increasing from 0 one by one.

$$X_i = S \cdot \tan(2 \cdot \theta a \cdot \sin(2\pi \cdot fh \cdot i \cdot \Delta t)) \tag{3}$$

As can be seen from the above equation (3), when the laser (light source 11, 12, or 13) is caused to emit light at regular time intervals, the irradiation positions are not at regular intervals on the screen 30. Thus, when a projection target image is actually projected, emitting times are determined as follows, for example.

In equation (2), S, θa, and fh are known constants. Thus, the emitting time t is represented as a function of the irradiation position X, as the following equation (4).

$$t = f(X) \tag{4}$$

When 0-th to N-th pixels are formed in the horizontal scanning direction, a position $X_n$ is the position of the n-th (n=0, 1, . . . , N) pixel on the screen 30 in the horizontal scanning direction. An emitting time $t_n$ for forming the n-th pixel is given by the following equation (5).

$$t_n = f(X_n) \tag{5}$$

That is, when the n-th pixel is formed, the emitting time $t_n$ corresponding to the n-th pixel is determined according to equation (4) from the position $X_n$ of the n-th pixel on the screen 30.

Here, for example, when a pixel is formed at the reference position O and M pixels are formed on each side thereof at regular intervals $\Delta X$, the position $X_n$ of the n-th (n=0, 1, ..., 2M) pixel on the screen 30 in the horizontal scanning direction is represented by the following equation (6).

$$X_n = -M \cdot \Delta X + n \cdot \Delta X \tag{6}$$

Figure 3:
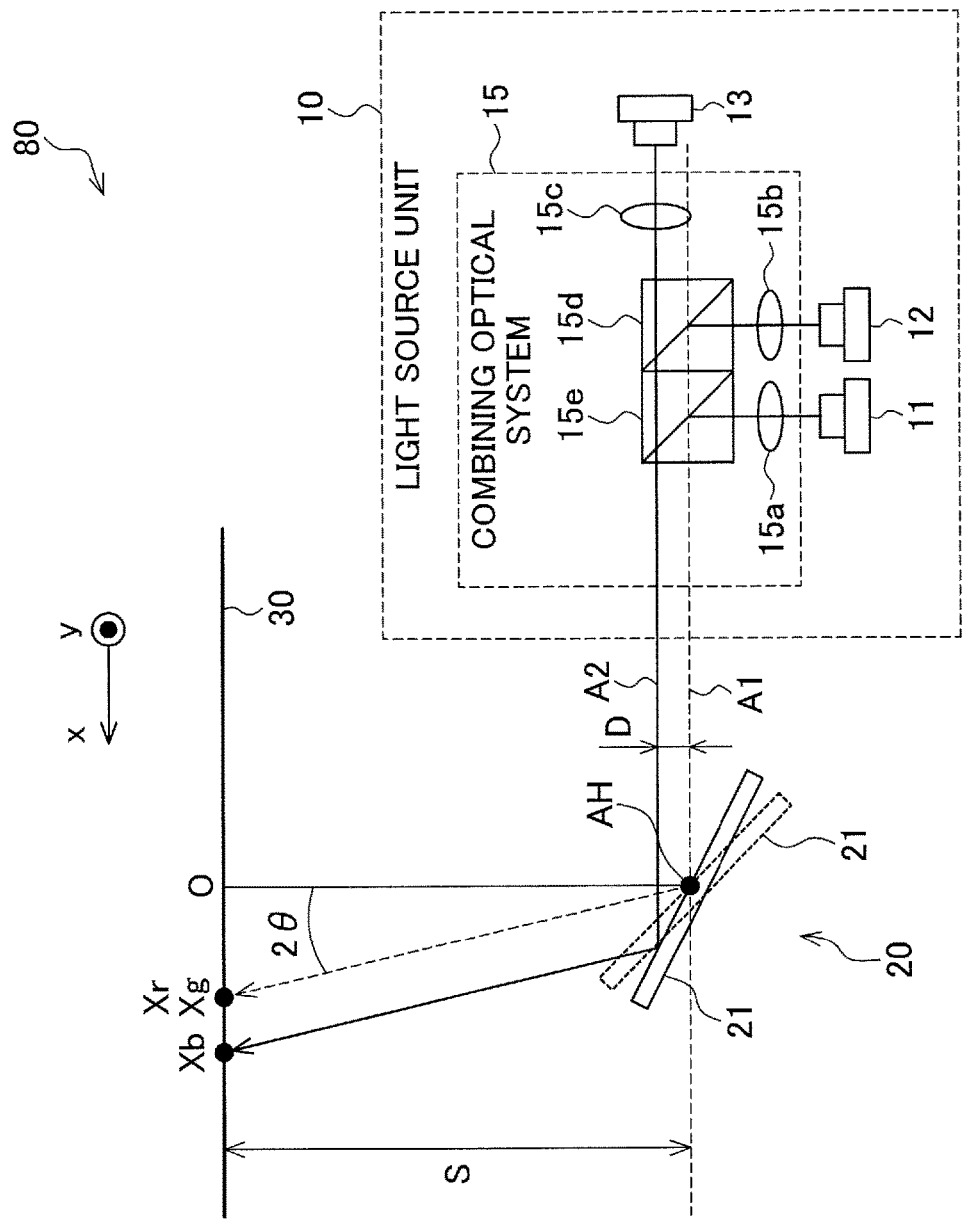
FIG. 3 is a diagram for explaining optical axis shift in the first embodiment.

FIG. 3 is a diagram schematically illustrating the light beam scanning optical system 80 when there is optical axis shift. Hereinafter, a case where there is optical axis shift will be described by using FIG. 3.

In FIG. 3, an optical axis A2 of the light beam of the blue laser 13 (light source 13) incident on the scanning mirror 21 is shifted from the reference optical axis A1 by a positional shift amount D in a direction corresponding to the horizontal scanning direction. The direction corresponding to the horizontal scanning direction is a direction perpendicular to the rotational axis AH and reference optical axis A1. That is, the direction corresponding to the horizontal scanning direction is an upward-downward direction on the drawing sheet of FIG. 3. That is, the optical axis A2 of the blue light beam has an optical axis shift of the positional shift amount D from the reference optical axis A1.

In this case, the red light beam and green light beam are incident on the rotational axis AH. On the other hand, the blue light beam is incident at a position shifted from the rotational axis AH.

Thus, when light beams of the three colors are emitted at the same time, an irradiation position Xb of the blue light beam in the horizontal scanning direction is shifted from irradiation positions Xr and Xg of the red light beam and green light beam in the horizontal scanning direction on the screen 30. Thus, when light beams of the three colors are emitted to the same pixel position on the screen 30 to form one pixel, the pixel displayed on the screen 30 is blurred.

Figure 4:
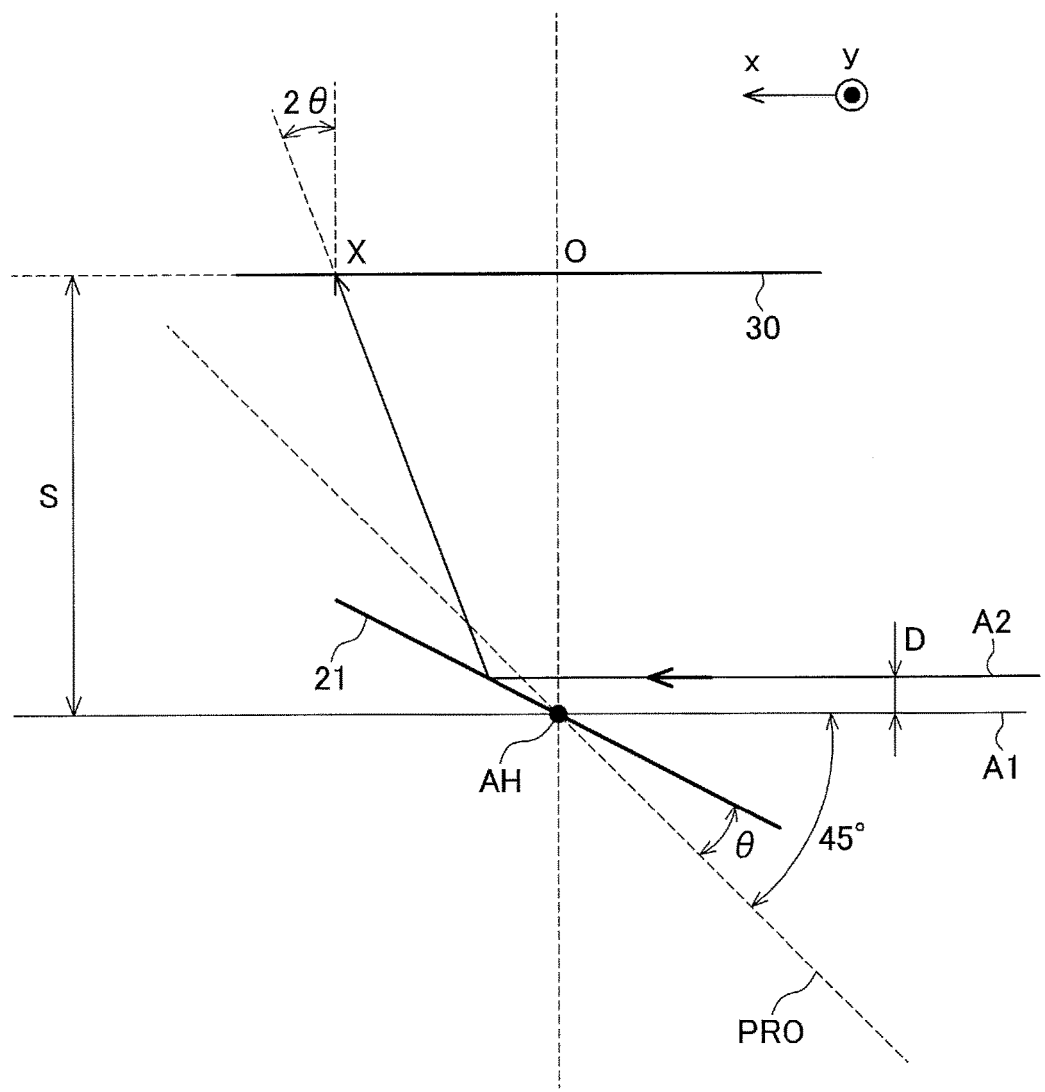
FIG. 4 is a diagram for explaining an irradiation position of a light beam when there is optical axis shift.

FIG. 4 is a diagram for explaining an irradiation position X of a light beam when there is optical axis shift. In FIG. 4, a rotational position RP0 indicated by a dashed line indicates the initial rotational position of the scanning mirror 21. Referring to FIG. 4, for the blue laser 13 (light source 13) having the optical axis shift D, the irradiation position X on the screen 30 in the horizontal scanning direction irradiated by a light beam emitted at an emitting time t can be represented by the following equation (7)

$$X = (S-D) \tan(2 \cdot \theta) + D/\tan(45-\theta) = (S-D)\tan(2 \cdot \theta a \cdot \sin(2\pi \cdot fh \cdot t)) + D/\tan(45-\theta a \cdot \sin(2\pi \cdot fh \cdot t)) \tag{7}$$

Substituting D=0 into the above equation (7) results in equation (2) without optical axis shift. Although a case where the blue light beam has optical axis shift has been described above as an example, the same applies to the other colors. That is, the same applies to the red light beam and green light beam.

As can be seen from equation (7), a difference occurs between the irradiation position of a light beam having no optical axis shift and the irradiation position of a light beam having an optical axis shift, the difference being not constant or linear with respect to θ. That is, it can be seen that this kind of shift between the irradiation positions of light beams varies depending on the angle θ of the scanning mirror 21 or the position on the screen 30 in the horizontal scanning direction.

Figure 5:
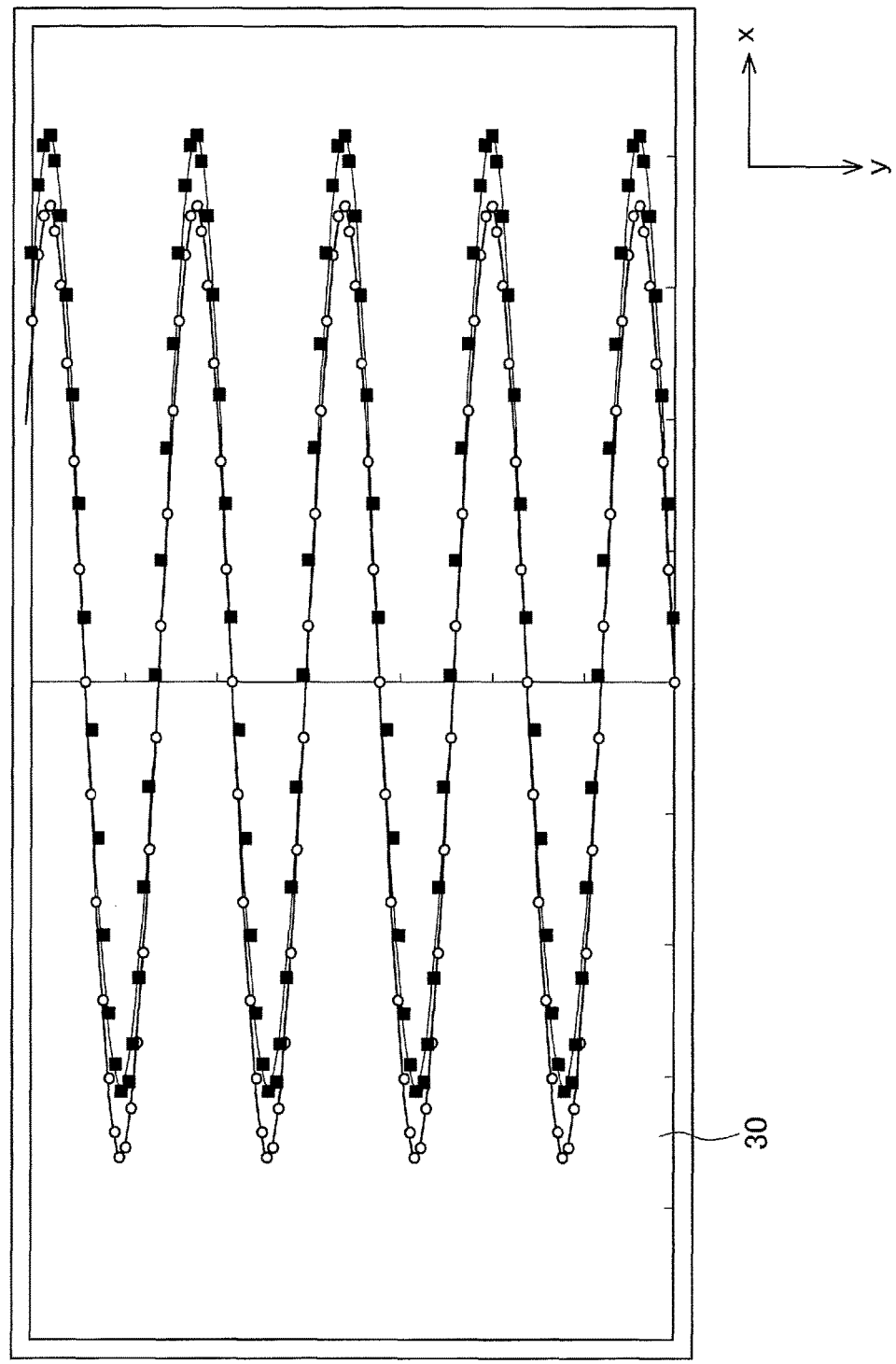
FIG. 5 is a schematic diagram illustrating a trajectory of irradiation positions on a screen of each of a light beam having optical axis shift and a light beam having no optical axis shift.

FIG. 5 is a schematic diagram illustrating a trajectory of irradiation positions on the screen 30 of each of the light beam having the optical axis shift D and the light beam having no optical axis shift calculated according to equation (7). A left-right direction on the drawing sheet of FIG. 5 corresponds to the horizontal scanning direction of the screen 30, and an upward-downward direction on the drawing sheet corresponds to the vertical scanning direction. FIG. 5 illustrates scanning in the vertical scanning direction as well as scanning of the light beams in the horizontal scanning direction. In FIG. 5, the white circles represent the irradiation positions of the light beam having the optical axis shift, and the black squares represent the irradiation positions of the light beam having no optical axis shift. Here, it illustrates a calculation result in a case where the light beam having the optical axis shift and the light beam having no optical axis shift are emitted simultaneously at regular time intervals. As illustrated in FIG. 5, the difference between the light beam having the optical axis shift and the light beam having no optical axis shift varies depending on the position in the horizontal scanning direction.

For example, suppose that a configuration is employed in which a detector, such as an optical receiver, is disposed at a particular position on the screen 30, a relative positional difference between light beams is detected by the detector, and an emitting time of each laser is corrected uniquely from a result of the detection. This configuration cannot irradiate accurate positions with light beams over the entire scanning range; or this configuration cannot remove blur of pixels over the entire scanning range. Thus, this configuration cannot project an image having good image quality.

The first embodiment is based on the viewpoint of irradiating an accurate position on the screen 30 with a light beam even when there is optical axis shift. The display controller 60 determines, according to equation (7), an emitting time (or laser light emitting time) of the light beam from the laser (light source 11, 12, or 13) of each color; or the display controller 60 determines, according to equation (7), an emitting time of the laser (light source 11, 12, or 13) of each color.

The determination of the emitting times will be described below by using the blue laser 13 (light source 13) as an example.

In equation (7), S, θa, and fh are known constants. From equation (7), the emitting time t can be represented as a function of the irradiation position X and positional shift amount D, as the following equation (8).

$$t = f_1(X, D) \tag{8}$$

The function $t = f_1(X, D)$ represents a relationship between the positional shift amount D, emitting time t, and irradiation position X. The display controller 60 determines, according to the function $t = f_1(X, D)$, from a previously obtained value of the positional shift amount and a target irradiation position on the screen 30 to be irradiated by the light beam, the emitting time of the light beam corresponding to the target irradiation position. The value of the positional shift amount is obtained by measurement in advance, for example.

A case where the light beam corresponding to each pixel of the projection target image is emitted from the blue laser 13 (light source 13) in accordance with an image signal I will be described as an example. Specifically, the display controller 60 determines, according to the function $t = f_1(X, D)$, by using a previously measured value of the positional shift amount D, the emitting time of the light beam corresponding to each pixel. At this time, the display controller 60 sets a position of each pixel on the screen 30 as the target irradiation position.

A case where 0-th to N-th pixels are formed in the horizontal scanning direction will be described as an example. A position $X_n$ is the position of the n-th (n=0, 1, . . . , N) pixel on the screen 30 in the horizontal scanning direction. A positional shift amount Db is the positional shift amount of the blue light beam.

The display controller 60 determines, from the function $t=f_1(X, D)$, the emitting time $tb_n$ of the blue light beam for forming the n-th pixel, as the following equation (9b).

$$tb_n=f_1(X_n,Db) \quad (9b)$$

The same applies to the red laser 11 (light source 11) and the green laser 12 (light source 12). The display controller 60 determines, using positional shift amounts Dr and Dg, the emitting times $tr_n$ and $tg_n$ of the red light beam and green light beam for forming the n-th pixel, as the following equations (9r) and (9g). The positional shift amount Dr is a measured value of the positional shift amount of the red light beam. The positional shift amount Dg is a measured value of the positional shift amount of the green light beam.

$$tr_n=f_1(X_n,Dr) \quad (9r)$$

$$tg_n=f_1(X_n,Dg) \quad (9g)$$

As can be seen from the above equations (9r), (9g), and (9b), the emitting times $tr_n$, $tg_n$, and $tb_n$ respectively depend on the positional shift amount Dr, Dg, and Db.

The display controller 60 generates a drive signal for each pixel for each color based on the emitting time for each pixel for each color determined as above. The drive signal for each pixel for each color is supplied via the laser driver 50 to the laser of each color. Then, the laser (light source 11, 12, or 13) of each color emits a light beam for each pixel at an emitting time corresponding to the supplied drive signal for each pixel. Thereby, the light beam of each color accurately irradiates the position of each pixel on the screen 30.

In the example of FIG. 1, the display controller 60 includes, as functional blocks for determining emitting times, the emitting time determiner 65 and holder 66.

The emitting time determiner 65 determines, for each color, according to the function $t=f_1(X, D)$, from a value of the positional shift amount D and the position of each pixel, the emitting time of the light beam for forming each pixel. The value of the positional shift amount D is held in the holder 66.

The function $t=f_1(X, D)$ may be represented by a table. The function $t=f_1(X, D)$ may also be represented by a mathematical formula. Thus, the emitting time determiner 65 may determine the emitting times with reference to a table. The emitting time determiner 65 may also determine the emitting times by calculating a mathematical formula.

The emitting time determiner 65 notifies the laser modulation pattern converter 63 of the determined emitting time for each pixel for each color.

The laser modulation pattern converter 63 outputs a drive signal for each pixel for each color at a time corresponding to the emitting time for each pixel for each color given from the emitting time determiner 65. At this time, the laser modulation pattern converter 63 uses a time when the scanning mirror 21 is at a center of the reciprocating motion (i.e., a time when $\theta=0$) as a time reference by using the synchronization signal from the mirror controller 40, for example.

The holder 66 holds the value of the positional shift amount D for each color used by the emitting time determiner 65. For example, a measuring person or measurement device measures the positional shift amount D for each color. Then, the obtained measurement value for each color is input into the holder 66. The holder 66 holds the input measurement value for each color as the value of the positional shift amount D for each color.

The measurement device may be provided outside the image projection device 1. The measurement device may also be included in the image projection device 1. The measurement of the positional shift amounts is performed, for example, in a factory before product shipment, but may be performed after product shipment.

The measurement of the positional shift amount D is performed as follows, for example.

When the scanning mirror 21 is not driven, the red laser 11 (light source 11) is caused to emit a light beam. Then, an irradiation position Xr of the light beam on the screen 30 is measured. The positional shift amount Dr of red is determined from the following equation (10). Equation (10) is obtained by substituting X=Xr, $\theta=0$, and D=Dr into equation (7).

$$Xr=Dr \quad (10)$$

The same applies to the green laser 12 (light source 12) and the blue laser 13 (light source 13). The positional shift amounts Dg and Db are determined by measuring the irradiation positions Xg and Xb, respectively.

The configuration of the light beam scanning optical system is not limited to the above configuration, and may be changed appropriately. The type of positional shift is also not limited to the above optical axis shift, and other positional shifts may be considered.

The relationship between the positional shift amount, emitting time, and irradiation position varies with different configurations of the light beam scanning optical system and considered positional shifts. Thus, the function used for determining an emitting time is also not limited to the above, and may be determined appropriately depending on the configuration of the optical system and considered positional shift.

The function used for determining an emitting time may be determined by geometric calculation or may be determined by experiment.

As described above, the image projection device 1 according to the first embodiment determines, from a previously obtained value of a positional shift amount D and a target irradiation position on the screen 30 to be irradiated by a light beam, an emitting time t of a light beam corresponding to the target irradiation position. The determination of the emitting time t of the light beam is based on a function representing a relationship between the positional shift amount D, emitting time t, and irradiation position X.

Thus, according to the first embodiment, the image projection device 1 can irradiate an accurate position on the screen 30 with a light beam. The image projection device 1 can also enhance accuracy of the irradiation position over the entire scanning range by using a function corresponding to the entire scanning range of the light beam.

Specifically, the image projection device 1 can irradiate an accurate pixel position on the screen 30 with a light beam for each pixel of the input image signal I, over the entire scanning range. Then, the image projection device 1 can faithfully project the projection target image represented by the image signal I on the screen 30.

Further, when the image projection device 1 according to the first embodiment projects an image by using light beams of multiple colors, it determines the emitting time for each color based on the function. Thereby, the image projection device 1 can irradiate an accurate position on the screen 30 with a light beam of each color.

For example, when the image projection device 1 forms one pixel by light beams of multiple colors, it can accurately irradiate the same pixel position on the screen 30 with light beams of the respective colors. Thereby, the image projection device 1 can reduce blur of a pixel projected on the screen 30 and display a color image having higher quality.

Second Embodiment

An image projection device 2 according to a second embodiment will be described below. The image projection device 2 differs from the image projection device 1 according to the first embodiment in determining an emitting time in consideration of angular shift of the scanning mirror but otherwise is the same. In the following description, descriptions of parts that are the same as in the first embodiment will be omitted or simplified, and the same reference characters will be given to elements that are the same as or correspond to those in the first embodiment.

The elements that are the same as or correspond to those in the first embodiment are the light source unit 10, scanning mirror unit 20, screen 30, mirror controller 40, laser driver 50, display controller 60, and buffer memory 70. The scanning mirror 21 has optical axis shift and angular shift.

Figure 6:
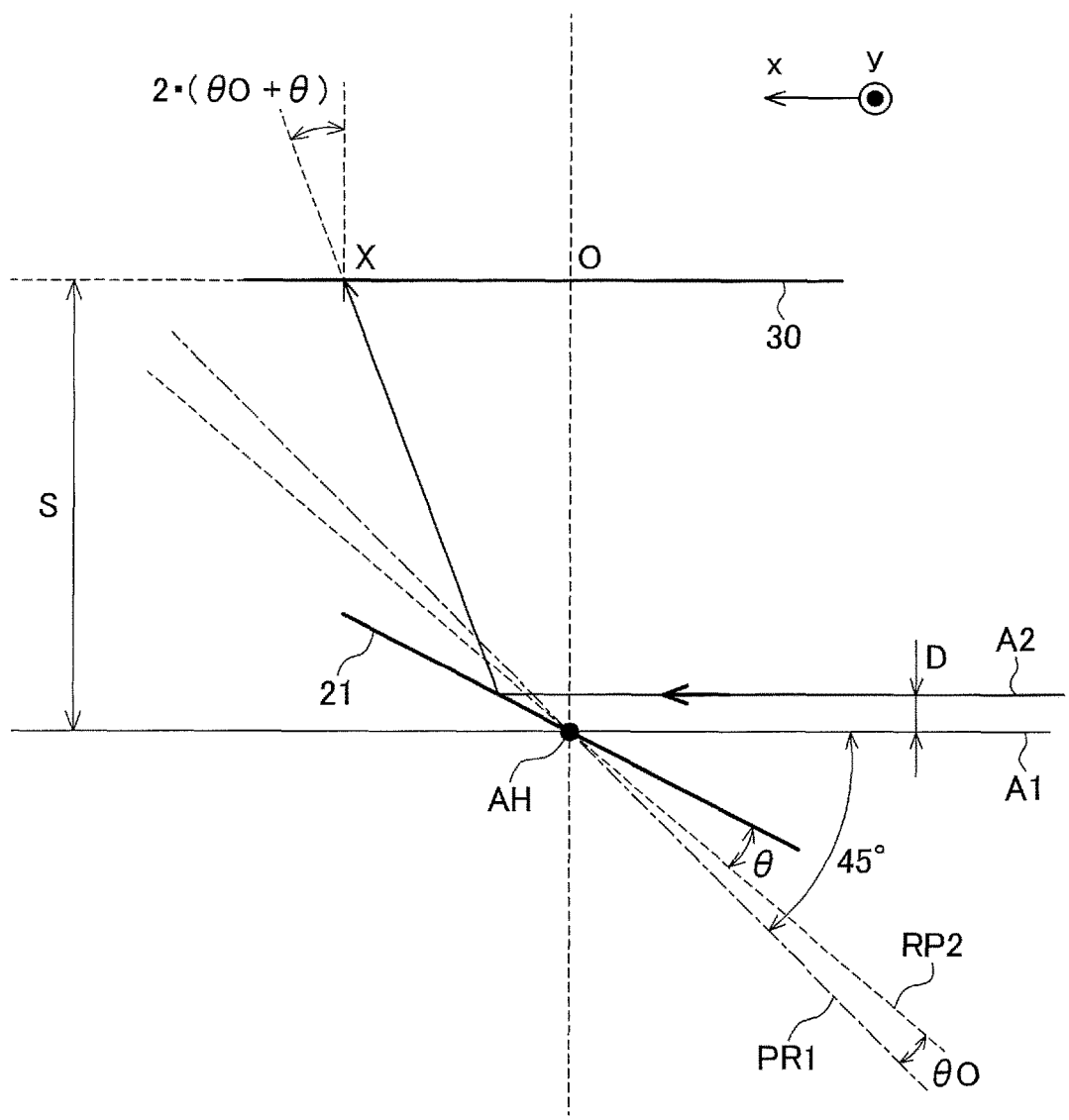
FIG. 6 is a diagram for explaining an irradiation position of a light beam when there are optical axis shift and angular shift, in a second embodiment.

FIG. 6 is a diagram for explaining an irradiation position of a light beam when there are optical axis shift and angular shift.

In FIG. 6, a rotational position RP1 indicated by a dot-and-dash line indicates a reference rotational position of the scanning mirror 21. The reference rotational position RP1 is a rotational position at which an angle formed by a normal to the scanning mirror 21 and the reference optical axis A1 is a predetermined reference angle. The reference rotational position RP1 is also a rotational position serving as a reference for determining an emitting time, and is an ideal initial rotational position of the scanning mirror 21. Here, the reference angle is 45 degrees.

A rotational position RP2 indicated by a dashed line indicates the initial rotational position of the scanning mirror 21. In FIG. 6, the initial rotational position RP2 of the scanning mirror 21 is shifted by a shift angle θ0 from the reference rotational position RP1. That is, the initial rotational position RP2 has an angular shift of the shift angle θ0 from the reference rotational position RP1. The shift angle is also referred to as the offset angle.

FIG. 6 is the same as FIG. 4 except that the scanning mirror 21 has the angular shift. The optical axis A2 of the light beam of the blue laser 13 (light source 13) has the optical axis shift of the positional shift amount D.

Referring to FIG. 6, for the blue laser 13 (light source 13) having the optical axis shift, an irradiation position X on the screen 30 in the horizontal scanning direction irradiated by a light beam emitted at an emitting time t can be represented by the following equation (11).

$$X=(S-D)\cdot\tan(2\cdot(\theta 0+\theta))+D/\tan(45-\theta 0-\theta)=(S-D)\cdot\tan(2\cdot(\theta 0+\theta a\cdot\sin(2\pi\cdot fh\cdot t)))+D/\tan(45-\theta 0-\theta a\cdot\sin(2\pi\cdot fh\cdot t)) \quad (11)$$

Substituting D=0 and θ0=0 into the above equation (11) results in equation (2) without optical axis shift and angular shift. Although a case where the blue light beam has optical axis shift has been described above as an example, the same applies to the light beams of the other colors. That is, the same applies to the red light beam and green light beam.

The second embodiment is based on the viewpoint of irradiating an accurate position with a light beam even when there are optical axis shift and angular shift. The display controller 60 determines, according to equation (11), an emitting time of the light beam from the laser (light source 11, 12, or 13) of each color. The determination of an emitting time will be described below by using the blue laser 13 (light source 13) as an example.

In equation (11), S, θa, and fh are known constants. From equation (11), the emitting time t can be represented as a function of the irradiation position X, positional shift amount D, and shift angle θ0, as the following equation (12).

$$t=f_2(X,D,\theta 0) \quad (12)$$

The function $t=f_2(X, D, \theta 0)$ represents a relationship between the positional shift amount D, emitting time t, irradiation position X, and shift angle θ0. The display controller 60 determines, according to the function $t=f_2(X, D, \theta 0)$, from a previously obtained value of the positional shift amount, a previously obtained value of the shift angle, and a target irradiation position on the screen 30 to be irradiated by a light beam, the emitting time of the light beam corresponding to the target irradiation position. The value of the positional shift amount and the value of the shift angle are obtained by measurement in advance, for example.

A case where a light beam corresponding to each pixel of the projection target image is emitted from the blue laser 13 (light source 13) in accordance with an image signal I will be described as an example. Specifically, the display controller 60 determines, according to the function $t=f_2(X, D, \theta 0)$, by using a value of the positional shift amount Db of blue and a value of the shift angle that are previously measured, the emitting time of the light beam corresponding to each pixel. At this time, the display controller 60 sets a position of each pixel on the screen 30 as the target irradiation position.

A case where 0-th to N-th pixels are formed in the horizontal scanning direction will be described as an example. A position $X_n$ is the position of the n-th (n=0, 1, . . . , N) pixel on the screen 30 in the horizontal scanning direction. A positional shift amount Db is the positional shift amount of the blue light beam. A shift angle θm is the shift angle of the scanning mirror 21.

The display controller 60 determines, from the function $t=f_2(X, D, \theta 0)$, an emitting time $tb_n$ of a blue light beam for forming the n-th pixel, as the following equation (13b).

$$tb_n=f_2(X_n,Db,\theta m) \quad (13b)$$

The same applies to the red laser 11 (light source 11) and the green laser 12 (light source 12). The display controller 60 determines, using positional shift amounts Dr and Dg and a measurement value θm of the shift angle, emitting times $tr_n$ and $tg_n$ of a red light beam and a green light beam for forming the n-th pixel, as the following equations (13r) and (13g). The positional shift amount Dr is a measurement value of the positional shift amount of the red light beam. The positional shift amount Dg is a measurement value of the positional shift amount of the green light beam.

$$tr_n=f_2(X_n,Dr,\theta m) \quad (13r)$$

$$tg_n=f_2(X_n,Dg,\theta m) \quad (13g)$$

In the second embodiment, the emitting time determiner 65 determines, for each color, according to the function t $f_2(X, D, \theta 0)$, from a value of the positional shift amount D and a value of the shift angle θm that are held in the holder 66, and the position of each pixel, an emitting time t of a light beam for forming each pixel.

The holder 66 holds a value of the shift angle θm used by the emitting time determiner 65, in addition to values of the positional shift amounts Dr, Dg, and Db of the respective colors. For example, a measuring person or measurement device measures the shift angle θm. Then, the obtained measurement value of the shift angle θm is input into the holder 66. The holder 66 holds the input measurement value as a value of the shift angle θm. The measurement device may be provided outside the image projection device 1. The measurement device may also be included in the image projection device 1. The measurement of the shift angle θm is performed, for example, in a factory before product shipment, but may be performed after product shipment.

The measurement of the shift angle θm is performed in, for example, one of the following ways (a) to (c). In the explanation of the following ways (a) to (c), the shift angle θm will be denoted by θ0.

(a) When the scanning mirror 21 is not driven, a light beam of one of the colors is emitted. An angle θ1 formed by the direction of the reflection light from the scanning mirror 21 and the direction of the incident light on the scanning mirror 21 is measured. The shift angle θ0 is calculated by the following equation (14).

$$\theta 0 = (\theta 1 - 90)/2 \tag{14}$$

(b) When the scanning mirror 21 is not driven, a light beam of one of the colors is emitted. An angle θ2 formed by the direction of the reflection light from the scanning mirror 21 and the normal direction to the screen 30 is measured. The shift angle θ0 is calculated by the following equation (15).

$$\theta 0 = \theta 2/2 \tag{15}$$

(c) A light beam of one of the colors is taken as a reference, and the optical components are arranged and adjusted so that for the reference light beam, the optical axis shift is zero. In this state, when the scanning mirror 21 is not driven, the reference light beam is emitted. Then, the irradiation position X1 on the screen 30 is measured. The shift angle θ0 is calculated by the following equation (16).

$$X1 = S \cdot \tan(2 \cdot \theta 0) \tag{16}$$

The measurement of the positional shift amounts is performed as follows after the shift angle θ0 is measured, for example.

When the scanning mirror 21 is not driven, the red laser 11 (light source 11) is caused to emit a light beam. The irradiation position Xr of the light beam on the screen 30 is measured. The positional shift amount Dr of the red light beam is determined from the following equation (17). Equation (17) is obtained by substituting X=Xr, θ=0, and D=Dr into equation (11).

$$Xr = (S - Dr) \cdot \tan(2 \cdot \theta 0) + Dr/\tan(45 - \theta 0) \tag{17}$$

The same applies to the green laser 12 (light source 12) and the blue laser 13 (light source 13). The positional shift amounts Dg and Db are determined by measuring the irradiation positions Xg and Xb, respectively.

As described above, the image projection device 2 according to the second embodiment determines, from a value of the positional shift amount D and a value of the shift angle θ0 that are previously obtained, and a target irradiation position on the screen 30 to be irradiated by the light beam, the emitting time t of the light beam corresponding to the target irradiation position. The determination of the emitting time t is based on a function representing a relationship between the positional shift amount D, emitting time t, irradiation position X1, and shift angle θ0.

Thus, according to the second embodiment, the image projection device 2 can irradiate an accurate position on the screen 30 with a light beam even when there is angular shift of the scanning mirror 21. Then, the image projection device 2 can obtain a good image.

Third Embodiment

Figure 7:
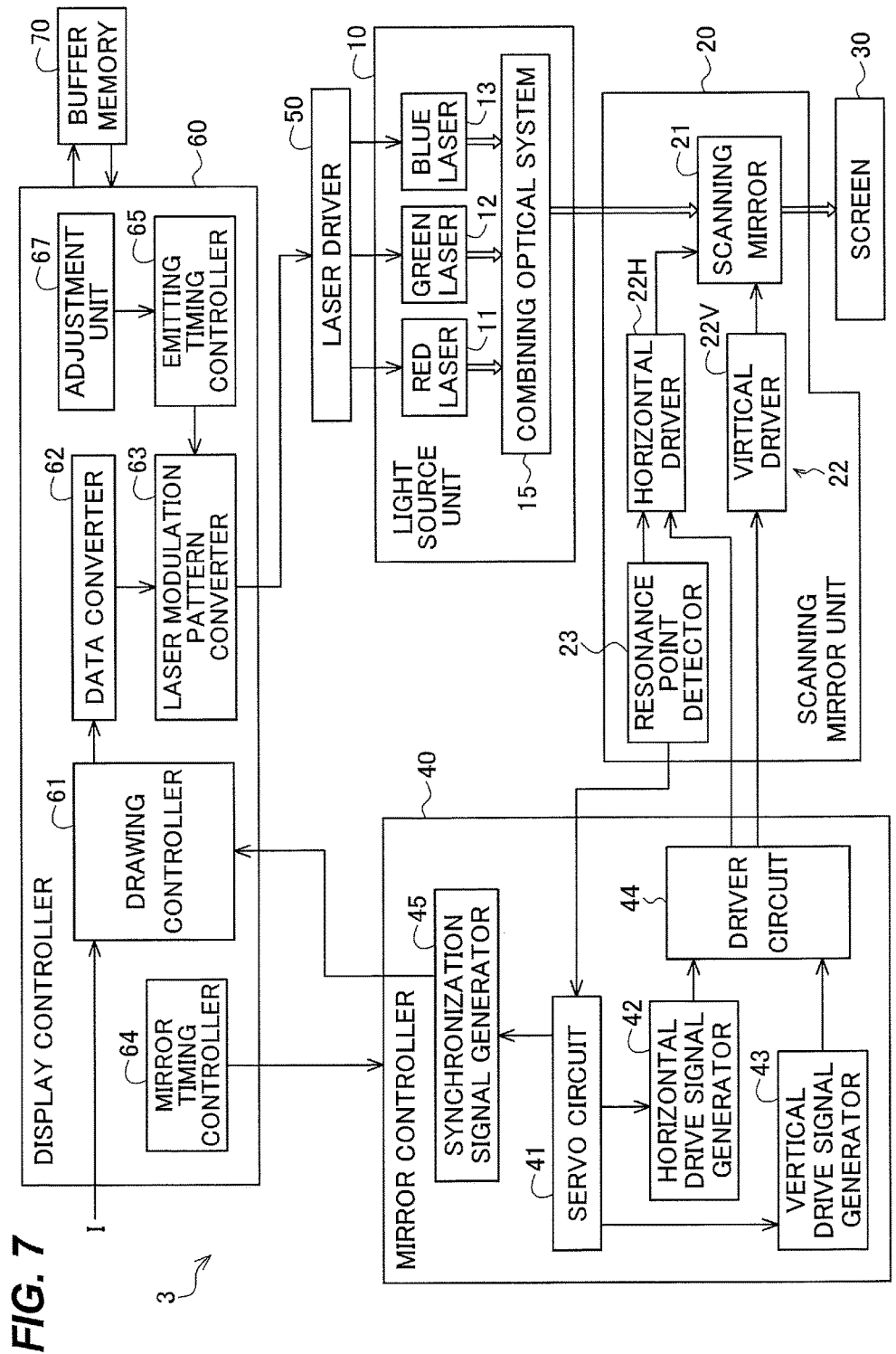
FIG. 7 is a block diagram schematically illustrating a configuration of an image projection device according to a third embodiment.

FIG. 7 is a block diagram schematically illustrating a configuration of an image projection device 3 according to a third embodiment. The image projection device 3 will be described below with reference to FIG. 7. In the following description, descriptions of parts that are the same as in the first embodiment will be omitted or simplified, and the same reference characters will be given to elements that are the same as or correspond to those in the first embodiment.

The elements that are the same as or correspond to those in the first embodiment are the light source unit 10, scanning mirror unit 20, screen 30, mirror controller 40, laser driver 50, and buffer memory 70. Of the elements in the display controller 60, the drawing controller 61, data converter 62, laser modulation pattern converter 63, mirror timing controller 64, and emitting time determiner 65 are elements that are the same as or correspond to those in the first embodiment. Of the elements in the display controller 60, the holder 66 in the first embodiment is replaced with an adjustment unit 67 in the third embodiment. In the third embodiment, the reference character 60 is used as the reference character of the display controller, similarly to the first embodiment.

As illustrated in FIG. 7, the image projection device 3 has much the same configuration as the image projection device 1 according to the first embodiment. However, it has the adjustment unit 67 instead of the holder 66. When the emitting time determiner 65 determines emitting times according to the functions, it uses parameter values as the values of the positional shift amounts. The parameter values are adjustable values adjusted by the adjustment unit 67.

The adjustment unit 67 adjusts the parameter values used by the emitting time determiner 65.

Specifically, the adjustment unit 67 adjusts the parameter values based on adjustment operation from an adjusting person or adjustment device, for example. The adjustment unit 67 then holds the adjusted parameter values. The emitting time determiner 65 uses the parameter values held by the adjustment unit 67.

The adjustment device may be provided outside the image projection device 3. The adjustment device may also be included in the image projection device 3. The adjustment of the parameter values is performed, for example, in a factory before product shipment, but may be performed after product shipment.

Here, the adjustment unit 67 has parameter values DPr, DPg, and DPb for red, green, and blue. That is, the adjustment unit 67 has the parameter value DPr for red. The adjustment unit 67 has the parameter value DPg for green. The adjustment unit 67 has the parameter value DPb for blue.

Next, the adjustment of the parameter values will be described. Here, a case where the parameter value DPb for blue is adjusted with the red light beam as a reference will be taken as an example.

The light beam scanning optical system 80 of the image projection device 3 is arranged and adjusted so that an optical axis of the red light beam, which is a reference, coincides with the reference optical axis A1. Thus, for the red light beam, serving as a reference, the positional shift amount Dr is zero. Then, the parameter value DPr for red is set to zero.

The adjustment unit 67 adjusts the parameter value DPb for blue so that for the same target irradiation position on the screen 30, an irradiation position on the screen 30 irradiated by the blue light beam coincides with an irradiation position on the screen 30 irradiated by the red light beam, serving as a reference.

A case where an image signal I in which a pattern to be projected is identical between the red laser 11 and the blue laser 13 is used as an adjustment image will be described as an example. The adjustment unit 67 adjusts the parameter value DPb for blue so that a pattern projected by the blue laser 13 coincides with a pattern projected by the red laser 11 on the screen 30.

For example, when the irradiation position on the screen 30 irradiated by the blue light beam shifts in the horizontal scanning direction in accordance with change in the positional shift amount of the blue light beam, the pattern of the adjustment image includes an image pattern, such as a linear pattern extending in the vertical scanning direction, having a component in the vertical scanning direction.

Figure 8:
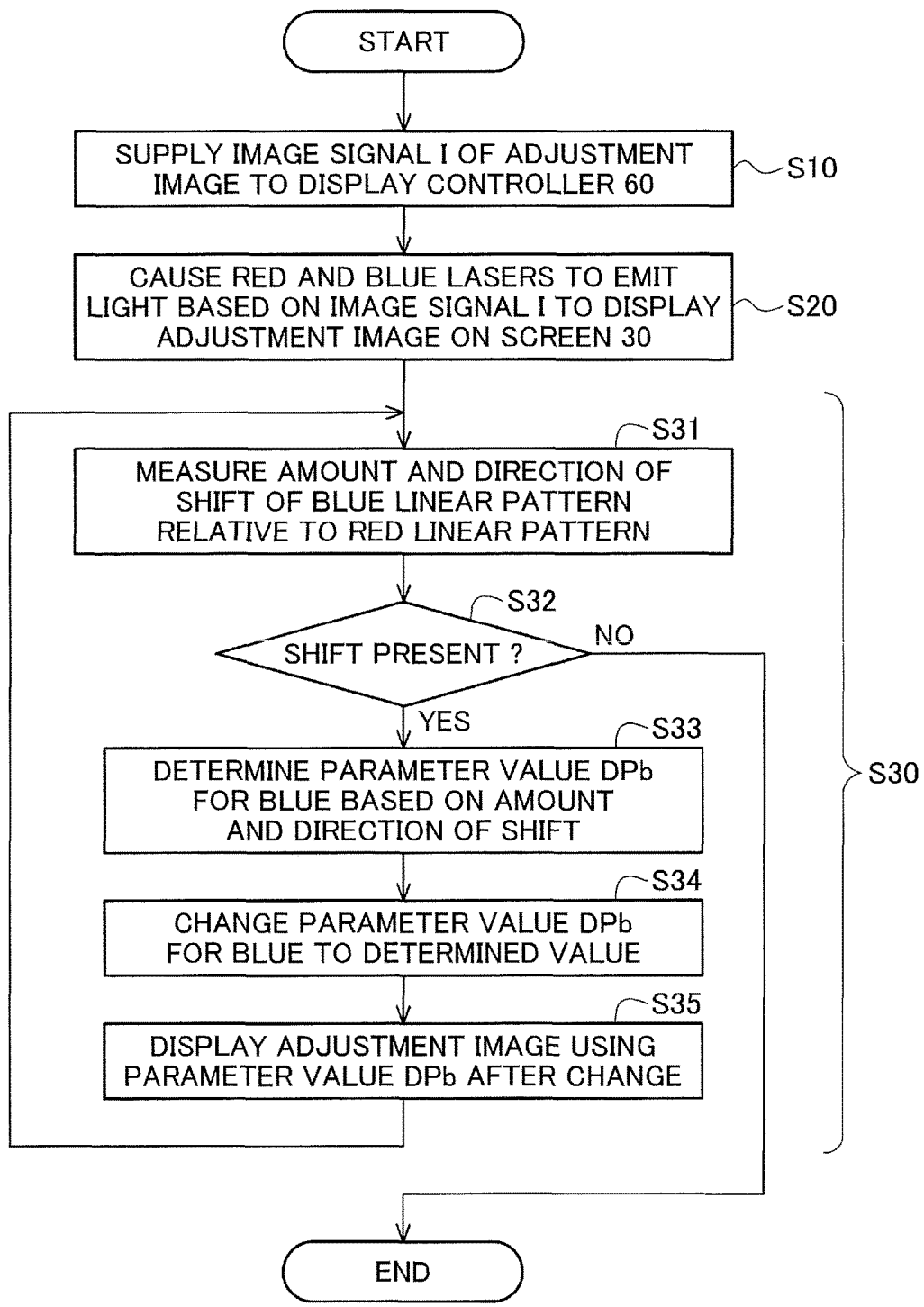
FIG. 8 is a flowchart illustrating a procedure in adjusting parameter values of the image projection device according to the third embodiment.
Figure 9:
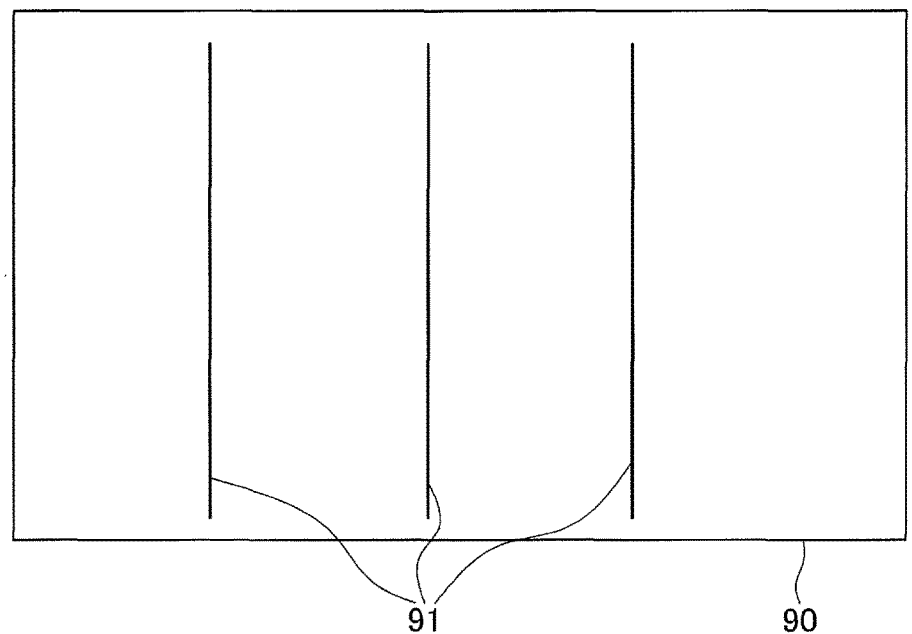
FIG. 9 is a schematic diagram illustrating an adjustment image used for adjusting the parameter values in the third embodiment.
Figure 10:
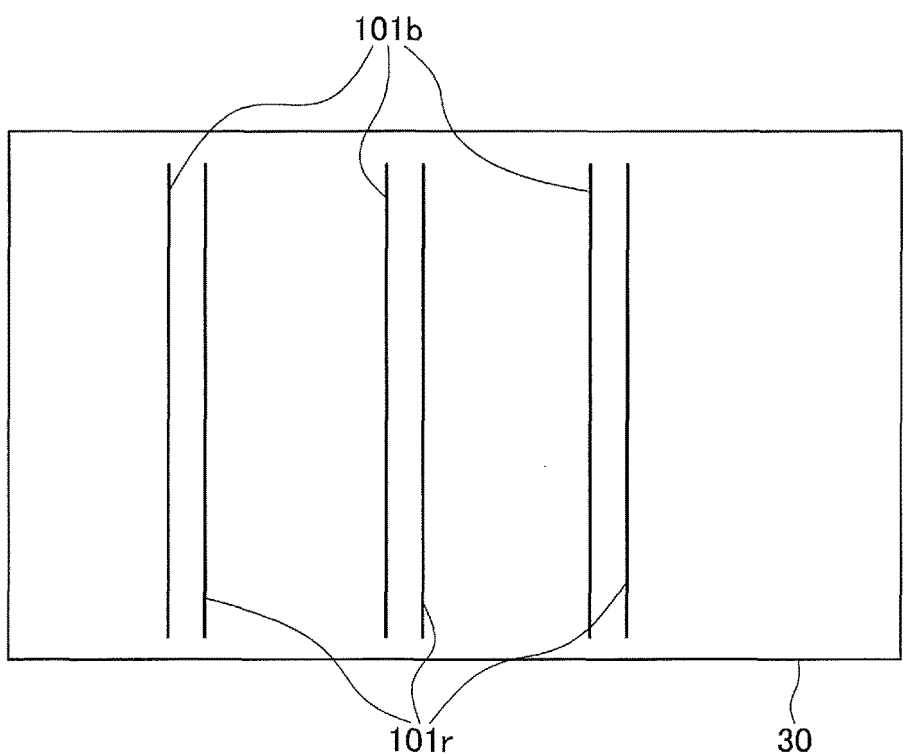
FIG. 10 is a schematic diagram illustrating an image displayed during adjustment of the parameter values in the third embodiment.

FIG. 8 is a flowchart illustrating a procedure in adjusting the parameter values of the image projection device 3 according to the third embodiment. FIG. 9 is a schematic diagram illustrating the adjustment image used for adjusting the parameter values. FIG. 10 is a schematic diagram illustrating an image displayed during adjustment of the parameter values. The adjustment procedure of the parameter values will be described below by using FIGS. 8, 9, and 10.

In step S10, an adjusting person or adjustment device supplies the display controller 60 with an image signal I representing an adjustment image 90 including a linear pattern 91 illustrated in FIG. 9.

In step S20, the display controller 60 generates drive signals for the red laser 11 (light source 11) and the blue laser 13 (light source 13) in accordance with the supplied image signal I. The display controller 60 causes the red laser 11 and blue laser 13 to emit light in accordance with the generated drive signals. At this time, the display controller 60 causes them to emit the red light beam and blue light beam at emitting times calculated according to the function t=f$_1$(X, D). At this time, the parameter value DPr for red is set to zero; the parameter value DPb for blue is set to an initial value (e.g., zero). A red linear pattern 101*r* extending in the vertical scanning direction and a blue linear pattern 101*b* extending in the vertical scanning direction are displayed on the screen 30 as illustrated in FIG. 10.

In step S30, in cooperation with the display controller 60, the adjusting person or adjustment device adjusts the parameter value DPb for blue so that the red linear pattern 101*r* and the blue linear pattern 101*b* coincide with each other on the screen 30. Specifically, step S30 includes the following steps S31 to S35.

In step S31, the adjusting person or adjustment device measures the amount and direction of shift of the blue linear pattern 101*b* relative to the red linear pattern 101*r* on the screen 30.

In step S32, the adjusting person or adjustment device determines, based on the measurement in step S31, whether there is a shift. If there is no shift, the adjustment ends. If there is a shift, it proceeds to step S33.

In step S33, the adjusting person or adjustment device determines, depending on the amount and direction of shift measured in step S31, a new value to be set as the parameter value DPb for blue. The adjusting person or adjustment device then inputs the new value into the adjustment unit 67 of the display controller 60.

In step S34, the adjustment unit 67 changes the parameter value DPb for blue to the input value.

In step S35, the display controller 60 displays the adjustment image by using the parameter value DPb after the change. Thereby, the blue linear pattern 101*b* shifts toward the red linear pattern 101*r* on the screen 30. After step S35, the procedure returns to step S31.

After the parameter value DPb for blue is adjusted by the above adjustment procedure, the parameter value DPg for green is adjusted in the same way as the above so that a red linear pattern and a green linear pattern coincide with each other on the screen 30. However, the order of adjustment is not limited this, and the adjustment may be performed in the order of green and blue.

According to the third embodiment described above, it is possible to obtain the same advantages as those of the first embodiment. It is also possible to easily adjust the emitting times by the image displayed on the screen 30.

In the third embodiment, for red, which is a reference, the parameter value DPr may be omitted. The emitting time determiner 65 does not treat the positional shift amount D as a variable. An emitting time may be determined according to a function t=f(X) representing a relationship between the emitting time t and irradiation position X.

The above description describes, as an example, a case where the red light beam is taken as a reference, but the green light beam or blue light beam may be taken as a reference.

Further, the above description describes, as an example, a case where the optical system is arranged and adjusted so that for the light beam serving as a reference, the positional shift amount is zero. However, the positional shift amount of the light beam serving as a reference need not necessarily be strictly adjusted to zero.

For example, without applying strict zero adjustment to the red light beam, the green light beam and blue light beam are relatively adjusted with the red light beam as a reference. Thereby, the parameter value DPg for green and the parameter value DPb for blue may be adjusted.

Even with such relative parameter adjustment, the image projection device 3 can make irradiation positions of the light beams of three colors coincide with each other on the screen 30. Specifically, the image projection device 3 can correct relative positional shifts of irradiation positions between each color over the entire scanning range. Thereby, the image projection device 3 can reduce blur of a pixel displayed on the screen 30. Then, the image projection device 3 can project an image having high quality.

Fourth Embodiment

Figure 11:
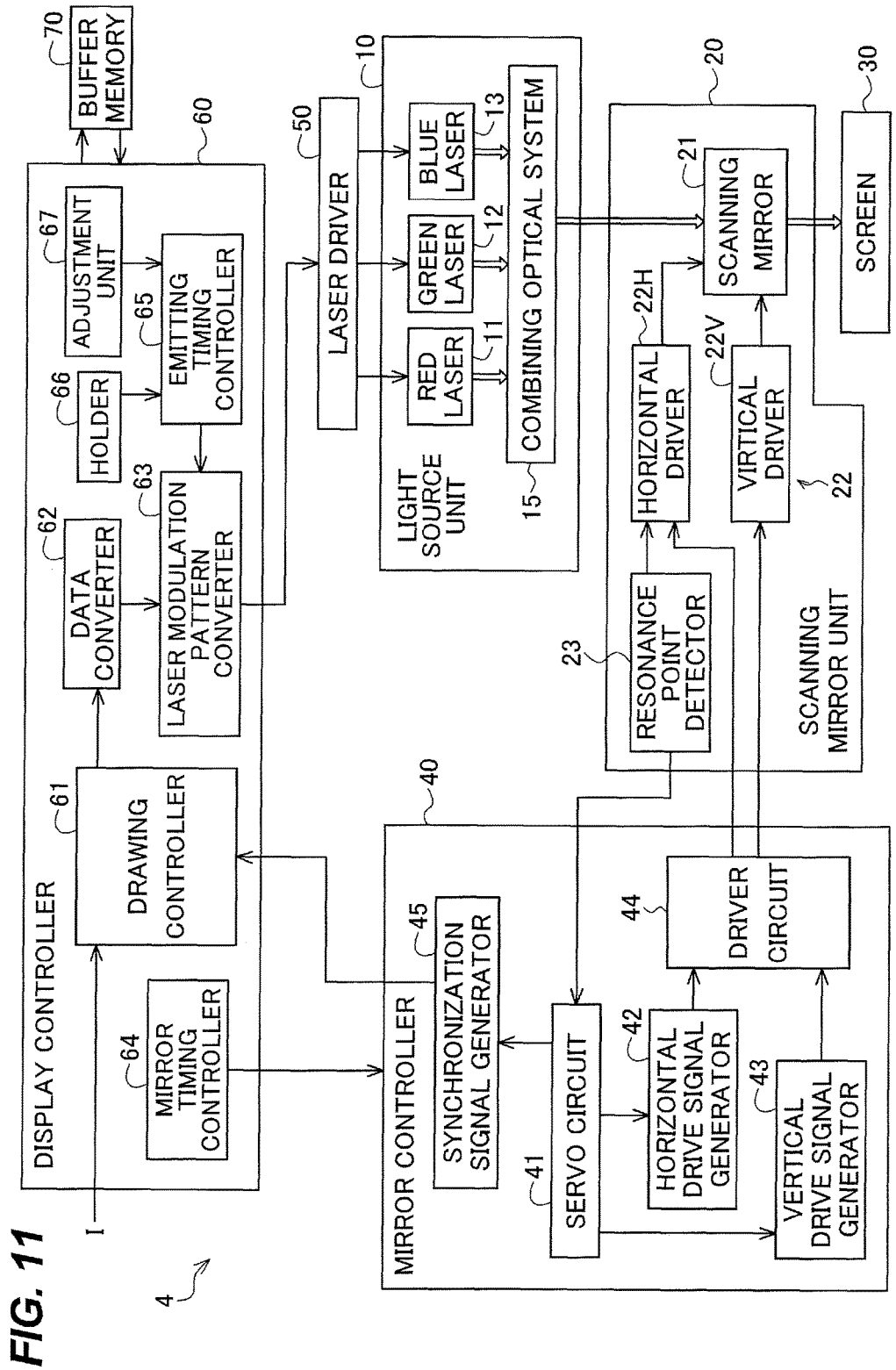
FIG. 11 is a block diagram schematically illustrating a configuration of an image projection device according to a fourth embodiment.

FIG. 11 is a block diagram schematically illustrating a configuration of an image projection device 4 according to a fourth embodiment. The image projection device 4 is obtained by combining the image projection device according to the second embodiment with the feature of the third embodiment. In the following description, descriptions of parts that are the same as in the second or third embodiment will be omitted or simplified, and the same reference characters will be given to elements that are the same as or correspond to those in the second or third embodiment.

The elements that are the same as or correspond to those in the second or third embodiment are the light source unit 10, scanning mirror unit 20, screen 30, mirror controller 40, laser driver 50, and buffer memory 70. The display controller 60 includes the holder 66, which is an element that is the same as or corresponds to that in the second embodiment. The display controller 60 includes the adjustment unit 67 that is the same as or corresponds to that in the third embodiment.

The image projection device 4 determines emitting times of the light beams in view of optical axis shift and angular shift, as in the second embodiment. The image projection device 4 uses adjustable parameter values as the positional shift amounts in determination of emitting times, as in the third embodiment.

As illustrated in FIG. 11, the image projection device 4 has much the same configuration as the image projection device 2 according to the second embodiment, but further includes the adjustment unit 67.

The emitting time determiner 65 determines, for each color, according to the function $t=f_2(X, D, \theta 0)$, the emitting time of the light beam for forming each pixel, as in the second embodiment. However, in the fourth embodiment, the emitting time determiner 65 uses, as the shift angle $\theta 0$, a value of the shift angle $\theta 0$ held in the holder 66. The emitting time determiner 65 also uses, as the positional shift amounts for the respective colors, the parameter values DPr, DPg, and DPb for the respective colors held in the adjustment unit 67.

The holder 66 holds a value of the shift angle $\theta 0$, as in the second embodiment. The measurement of the shift angle $\theta 0$ is performed as in the second embodiment. However, in the fourth embodiment, the holder 66 does not hold the positional shift amounts Dr, Dg, and Db for the respective colors.

The adjustment unit 67 adjusts and holds the parameter values DPr, DPg, and DPb for the respective colors, as in the third embodiment. The adjustment of the parameter values DPr, DPg, and DPb is performed as in the third embodiment. However, in the fourth embodiment, when the adjustment image is displayed, the function $t=f_2(X, D, \theta 0)$ is used; the value held in the holder 66 is used as the shift angle $\theta 0$.

The above-described fourth embodiment provides the same advantages as the second and third embodiments.

Fifth Embodiment

An image projection device 5 according to a fifth embodiment will be described below. The image projection device 5 differs from the image projection device 1 according to the first embodiment in the configuration of the light beam scanning optical system, a type of positional shift, and the function used. Otherwise, the image projection device 5 is the same as the image projection device 1. In the following description, descriptions of parts that are the same as in the first embodiment will be omitted or simplified, and the same reference characters will be given to elements that are the same as or correspond to those in the first embodiment.

The elements that are the same as or correspond to those in the first embodiment are the scanning mirror unit 20, screen 30, mirror controller 40, laser driver 50, display controller 60, and buffer memory 70. A light source unit 510 includes a multi-wavelength light source 511 and a collimator lens 512.

Figure 12:
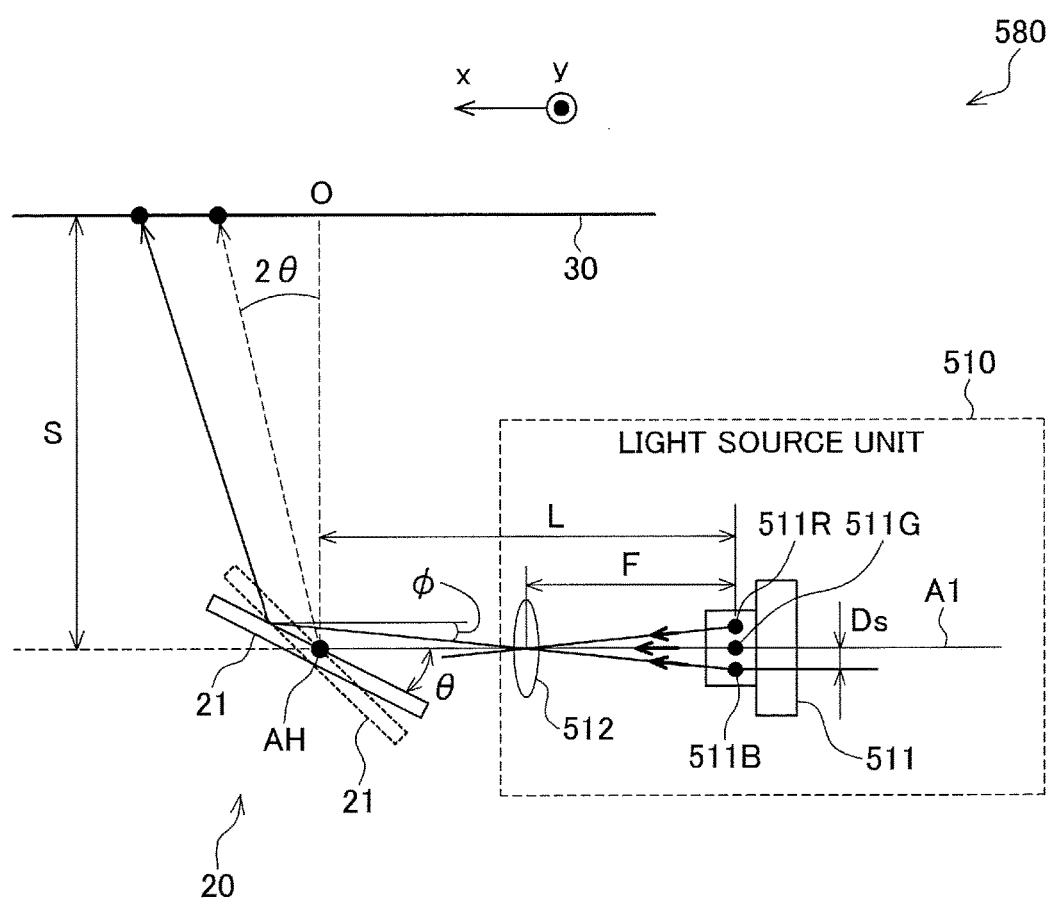
FIG. 12 is a diagram schematically illustrating a light beam scanning optical system in a fifth embodiment.

FIG. 12 is a diagram schematically illustrating a light beam scanning optical system 580 in the fifth embodiment.

In FIG. 12, the light beam scanning optical system 580 includes the scanning mirror unit 20 and screen 30, as in the first embodiment. Further, the reference optical axis A1 perpendicularly intersecting the rotational axis AH is set, as in the first embodiment.

The light beam scanning optical system 580 includes the light source unit 510, which is different from the light source unit 10 of the first embodiment. The light source unit 510 includes the multi-wavelength light source 511, which emits multiple light beams having different wavelengths, and the collimator lens 512.

The multi-wavelength light source 511 includes a red laser 511R, a green laser 511G, and a blue laser 511B as multiple light sources that emit light beams having different wavelengths.

The collimator lens 512 is disposed between the multi-wavelength light source 511 and the scanning mirror 21. The collimator lens 512 converts divergence angles of light beams of the respective colors emitted from the multi-wavelength light source 511. The collimator lens 512 has an optical axis coinciding with the reference optical axis A1 perpendicularly intersecting the rotational axis AH of the scanning mirror 21. The collimator lens 512 also has a focal length f.

The red laser 511R, green laser 511G, and blue laser 511B are disposed a distance F away from the collimator lens 512 in the direction of the reference optical axis A1. Here, the distance F is equal to the focal length f of the collimator lens 512. However, the distance F need not necessarily be equal to the focal length f, and may be set to a value greater or less than the focal length f.

For example, the distance F may be set to a distance such that a light beam is concentrated or focused on the screen 30. The lasers 511R, 511G, and 511B of the respective colors are disposed a distance L away from the rotational axis AH in the direction of the reference optical axis A1. Further, the red laser 511R, green laser 511G, and blue laser 511B are arranged along a direction (upward-downward direction on the drawing sheet of FIG. 12) perpendicular to the rotational axis AH and reference optical axis A1.

Here, the green laser 511G is disposed on the reference optical axis A1 (optical axis of the collimator lens 512). The red laser 511R and blue laser 511B are disposed off the reference optical axis A1. The red laser 511R is disposed on the screen 30 side. The blue laser 511B is disposed on the opposite side of the screen 30. The positions of the red laser 511R and blue laser 511B are off the reference optical axis A1. That is, the red laser 511R and blue laser 511B have light source shift from the reference optical axis A1.

With attention given to the blue laser 511B, the irradiation position X when there is light source shift will be described below. The red laser 511R can be considered similarly to the blue laser 511B, so description thereof will be omitted.

In FIG. 12, the position of the blue laser 511B is shifted from the reference optical axis A1 by a positional shift amount Ds in a direction corresponding to the horizontal scanning direction. The direction corresponding to the horizontal scanning direction is a direction perpendicular to the rotational axis AH and reference optical axis A1. The direction corresponding to the horizontal scanning direction is also an upward-downward direction on the drawing sheet of FIG. 12.

An angle $\varphi$ formed by the blue light beam incident on the scanning mirror 21 and the reference optical axis A1 is represented by the following equation (18) from the distance F and positional shift amount Ds. The angle formed by the blue light beam incident on the scanning mirror 21 and the reference optical axis A1 is an incident angle of the blue light beam on the collimator lens 512.

$$\varphi = \tan^{-1}(Ds/F) \qquad (18)$$

Figure 13:
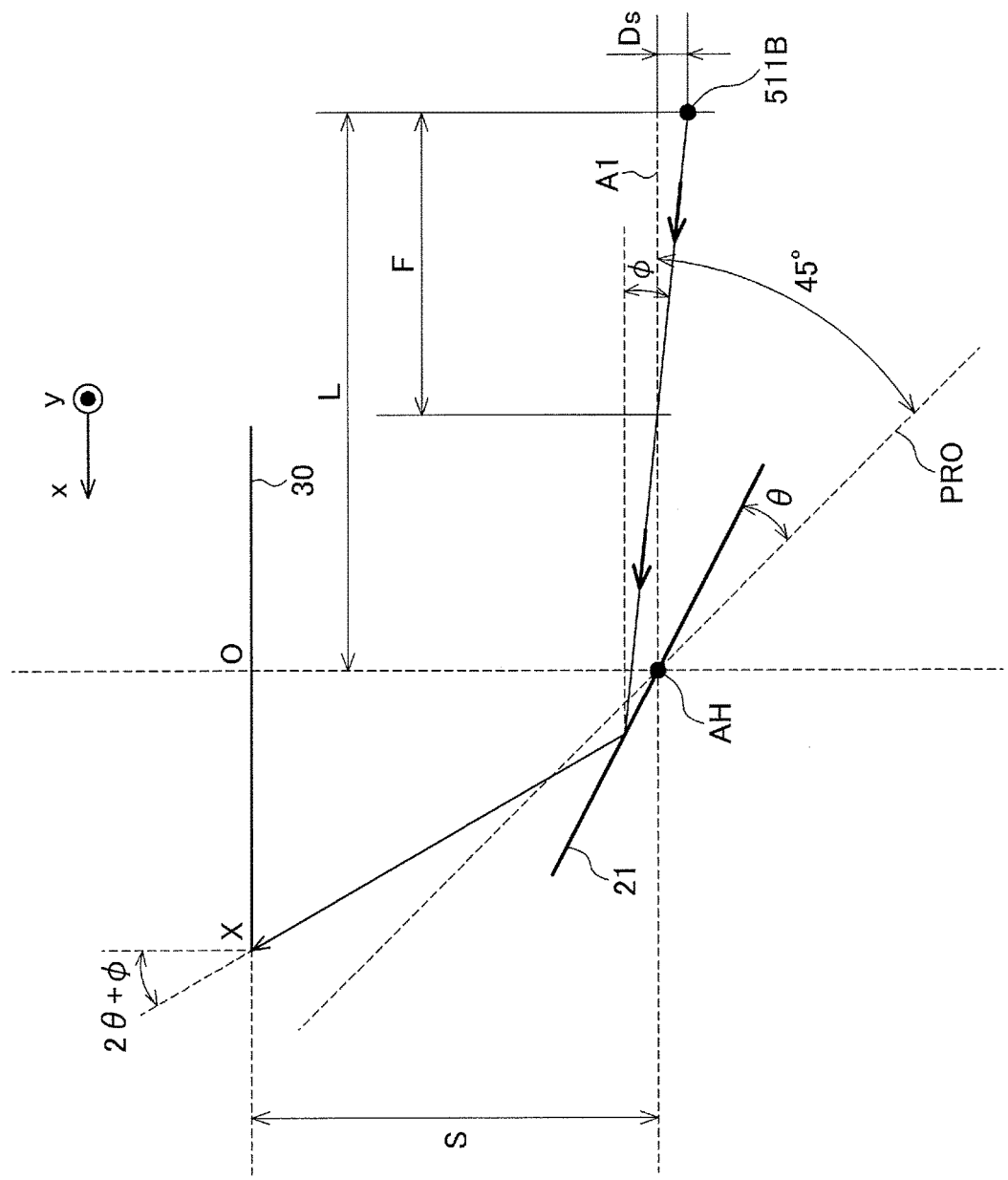
FIG. 13 is a diagram for explaining an irradiation position of a light beam when there is light source shift, in the fifth embodiment.

FIG. 13 is a diagram for explaining an irradiation position X of a light beam when there is light source shift. Referring to FIG. 13, for the light beam of the blue laser 13 having the light source shift Ds, the irradiation position X on the screen 30 in the horizontal scanning direction irradiated by a light beam emitted at an emitting time t can be represented by the following equation (19).

$$X=(S-(L\cdot\tan(\varphi)-Ds))\cdot\tan(2\cdot\theta+\varphi)+(L\cdot\tan(\varphi)-Ds)/\tan(45-\theta),\varphi=\tan^{-1}(Ds/F),\theta=\theta a\cdot\sin(2\pi\cdot fh\cdot t) \quad (19)$$

As can be seen from the above equation (19), a difference occurs between the irradiation position X of a light beam having no light source shift Ds and the irradiation position X of a light beam having a light source shift Ds, the difference being not constant or linear with respect to the angle θ of the scanning mirror 21. That is, it can be seen that this kind of shift between the irradiation positions X of light beams varies depending on the angle θ of the scanning mirror 21 or the position on the screen 30 in the horizontal scanning direction.

For example, suppose that a configuration is employed in which a detector, such as an optical receiver, is disposed at a particular position on the screen 30, a relative positional difference between light beams is detected by the detector, and an emitting time of each laser is corrected uniquely from a result of the detection. This configuration cannot irradiate accurate positions with light beams over the entire scanning range; or this configuration cannot remove blur of pixels over the entire scanning range. Thus, this configuration cannot project an image having good image quality.

In the fifth embodiment, the display controller 60 determines, according to equation (19), emitting times t of the light beams from the lasers 511R, 511G, and 511B of the respective colors.

In equation (19), S, L, F, θa, and fh are known constants. From equation (19), the emitting time t can be represented as a function of the irradiation position X and positional shift amount Ds, as the following equation (20).

$$t=f_3(X,Ds) \quad (20)$$

The display controller 60 determines, from a previously obtained value of the positional shift amount Ds and a target irradiation position, the emitting time t of the light beam corresponding to the target irradiation position. The determination of the emitting time t of the light beam is based on the function t=$f_3$(X, Ds) representing a relationship between the positional shift amount Ds, emitting time t, and irradiation position X. The above value of the positional shift amount Ds can be obtained by measuring the irradiation position X when the scanning mirror 21 is not driven, as in the first embodiment, for example.

The display controller 60 determines, for each color, an emitting time according to the function t=$f_3$(X, Ds), for example. However, for a color (green in FIG. 12) without light source shift, the display controller 60 does not use the positional shift amount Ds as a variable; and an emitting time t may be determined according to a function representing a relationship between the emitting time t and irradiation position X.

According to the fifth embodiment described above, even when there is light source shift, the image projection device 5 can irradiate an accurate position on the screen 30 with a light beam. Then, the image projection device 5 can obtain a good image. Further, with the configuration of the optical system of the fifth embodiment illustrated in FIG. 12, it is possible to simplify the configuration of the light source unit 10 of the image projection device 1.

The positions and arrangement order of the light sources of the respective colors are not limited to the above, and may be changed appropriately.

Further, the optical system and function in the fifth embodiment may be applied to the third embodiment. That is, in the third embodiment, the light beam scanning optical system 580 of FIG. 12 may be used instead of the light beam scanning optical system 80 of FIG. 3, and the function t=$f_3$(X, Ds) may be used instead of the function t=$f_1$(X, D). In this case, for example, the parameter values for the red light beam and blue light beam are adjusted with the green light beam as a reference in the same way as the third embodiment.

Sixth Embodiment

An image projection device 6 according to the sixth embodiment will be described below. The image projection device 6 differs from the image projection device 5 according to the fifth embodiment in determining an emitting time in view of angular shift of the scanning mirror, but otherwise is the same. In the following description, descriptions of parts that are the same as in the fifth embodiment will be omitted or simplified, and the same reference characters will be given to elements that are the same as or correspond to those in the fifth embodiment.

The elements that are the same as or correspond to those in the fifth embodiment are the light source unit 510, scanning mirror unit 20, screen 30, mirror controller 40, laser driver 50, display controller 60, and buffer memory 70. The light source unit 510 includes the multi-wavelength light source 511 and collimator lens 512.

Figure 14:
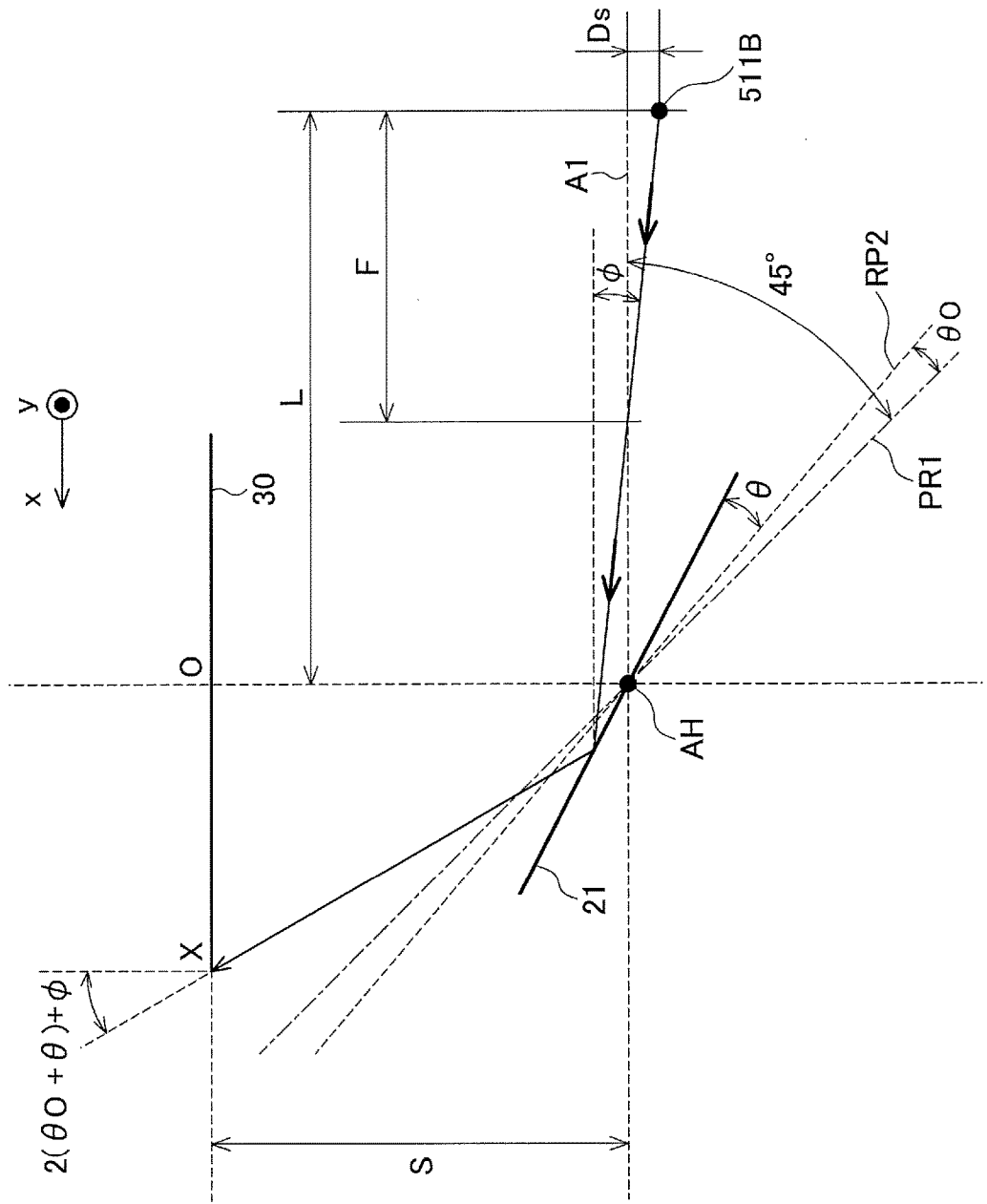
FIG. 14 is a diagram for explaining an irradiation position of a light beam when there are light source shift and angular shift, in a sixth embodiment.

FIG. 14 is a diagram for explaining an irradiation position of a light beam when there are light source shift and angular shift. In FIG. 14, as in the second embodiment, the initial rotational position RP2 of the scanning mirror 21 is shifted from the reference rotational position RP1 by a shift angle (offset angle) θ0. That is, the initial rotational position RP2 has an angular shift of the shift angle θ0 from the reference rotational position RP1. FIG. 14 is the same as FIG. 13 except that the scanning mirror 21 has the angular shift. The blue laser 511B has a light source shift of a positional shift amount Ds from the reference optical axis A1. Referring to FIG. 14, for the light beam of the blue laser 511B having the light source shift Ds, the irradiation position X on the screen 30 in the horizontal scanning direction irradiated by the light beam emitted at an emitting time t can be represented by the following equation (21).

$$X=(S-(L\cdot\tan(\varphi)-Ds))\cdot\tan(2\cdot(\theta0+\theta)+\varphi)+(L\cdot\tan(\varphi)-Ds)/\tan(45-\theta0-\theta),\varphi=\tan^{-1}(Ds/F),\theta=\theta a\cdot\sin(2\pi\cdot fh\cdot t) \quad (21)$$

In the sixth embodiment, the display controller 60 determines, according to equation (21), emitting times t of the light beams from the lasers 511R, 511G, and 511B of the respective colors.

In equation (21), S, L, F, θa, and fh are known constants. From equation (21), the emitting time t can be represented as a function of the irradiation position X, positional shift amount Ds, and shift angle θ0, as the following equation (22).

$$t=f_4(X,Ds,\theta0) \quad (22)$$

The display controller 60 determines, from a previously obtained value of the positional shift amount Ds, a previously obtained value of the shift angle θ0 and a target irradiation position on the screen 30 to be irradiated by the light beam, the emitting time t of the light beam corresponding to the target irradiation position. The determination of the emitting time t of the light beam is based on the function $t=f_4(X, Ds, \theta 0)$ representing a relationship between the positional shift amount Ds, emitting time t, irradiation position X, and shift angle $\theta 0$. The above value of the positional shift amount Ds and the value of the shift angle $\theta 0$ can be obtained by measurement in advance, for example.

The specific configuration and process of the display controller 60 are the same as those in the second embodiment, so descriptions thereof will be omitted here.

The measurement of the shift angle $\theta 0$ is performed by one of the following ways (d) to (f), for example.

(d) When the scanning mirror 21 is not driven, a light beam of a laser (here, green laser 511G) without light source shift is emitted. An angle $\theta 1$ formed by the direction of the reflection light from the scanning mirror 21 and the direction of the incident light on the scanning mirror 21 is measured. The shift angle $\theta 0$ is calculated according to the above equation (14).

(e) When the scanning mirror 21 is not driven, a light beam of a laser (here, green laser 511G) without light source shift Ds is emitted. An angle $\theta 2$ formed by the direction of the reflection light from the scanning mirror 21 and the normal direction to the screen 30 is measured. The shift angle $\theta 0$ is calculated according to the above equation (15).

(f) When the scanning mirror 21 is not driven, a light beam of a laser (here, green laser 511G) without light source shift Ds is emitted. The irradiation position X1 on the screen 30 is measured. The shift angle $\theta 0$ is calculated according to the above equation (16).

After the shift angle $\theta 0$ is measured, the value of the positional shift amount Ds can be obtained by measuring the irradiation position when the scanning mirror 21 is not driven, as in the second embodiment, for example.

The sixth embodiment described above provides the same advantages as the second and fifth embodiments.

The optical system and function in the sixth embodiment may be applied to the fourth embodiment. That is, in the fourth embodiment, the light beam scanning optical system 580 may be used instead of the light beam scanning optical system 80, and the function $t=f_4(X, Ds, \theta 0)$ may be used instead of the function $t=f_2(X, D, \theta 0)$. In this case, for example, the parameter values for the red light beam and blue light beam are adjusted with the green light beam as a reference in the same way as the fourth embodiment.

In this specification, "parallel" is not limited to parallel in the strict sense and includes substantially parallel. The above-described embodiments may use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

In the above first to sixth embodiments, the function of the image projection device 1 or display controller 60 may be implemented purely by electronic circuits or other hardware resources, or by cooperation of hardware resources and software. In the latter case, the function of the image projection device 1 or display controller 60 is implemented by execution of a computer program by a computer, for example. More specifically, a computer program recorded on a recording medium such as a read only memory (ROM) is read into a main memory and executed by a central processing unit (CPU), thereby implementing the function. The computer program may be provided by being recorded on a computer-readable recording medium such as an optical disc, or may be provided through a communication line such as the Internet.

The present invention is not limited to the above embodiments described above; it can be practiced in various aspects without departing from the invention scope. For example, the colors or wavelengths of the respective light sources are not limited to the above, and may be changed appropriately. Further, the number of light sources is not limited to three, and may be one, two, or four or more.

DESCRIPTION OF REFERENCE CHARACTERS 1, 3, 4 image projection device, 10 light source unit, 11 red laser, 12 green laser, 13 blue laser, 20 scanning mirror unit, 21 scanning mirror, 22 drive unit, 30 screen, 40 mirror controller, 50 laser driver, 60 display controller, 65 emitting time determiner, 66 holder, 67 adjustment unit, 70 buffer memory.

What is claimed is:

1. An image projection device comprising:
a light source unit including a first light source for emitting a first light beam;
a scanning mirror unit including a scanning mirror for reflecting the first light beam emitted from the first light source, the scanning mirror unit projecting an image onto a projection surface by rotating the scanning mirror about a rotational axis to scan the first light beam; and
a controller for determining, according to a function representing a relationship between a first positional shift amount, an emitting time of the first light beam emitted from the first light source, an irradiation position on the projection surface irradiated by the first light beam emitted from the first light source at the emitting time, and a shift angle of the scanning mirror from a reference rotational position, the emitting time of the first light beam emitted from the first light source corresponding to a target irradiation position, the first positional shift amount being a second positional shift amount that is a shift amount of a position of the first light beam incident on the scanning mirror or a third positional shift amount that is a shift amount of a position of the first light source relative to a reference optical axis, the reference optical axis being an optical axis of light incident on the scanning mirror without the first positional shift amount and perpendicularly intersecting the rotational axis, the reference rotational position being a rotational position of the scanning mirror when the scanning mirror is not driven.

2. The image projection device of claim 1, wherein:
the first light beam emitted from the first light source is incident on the scanning mirror,
the second positional shift amount is a positional shift amount of an optical axis of the first light beam incident on the scanning mirror from the reference optical axis in a direction perpendicular to the rotational axis and the reference optical axis, and
the third positional shift amount is a positional shift amount of the first light source from the reference optical axis in the direction perpendicular to the rotational axis and the reference optical axis.

3. The image projection device of claim 2, further comprising a collimator lens disposed between the first light source and the scanning mirror, the collimator lens converting a divergence angle of the first light beam emitted from the first light source, wherein:
the collimator lens has an optical axis coinciding with the reference optical axis.

4. The image projection device of claim 3, wherein, as viewed from the rotational axis direction:
the scanning mirror scans the first light beam over the projection surface in a scanning direction,
a reference angle is 45 degrees, the reference angle being an angle formed by a normal to the scanning mirror at the reference rotational position and the reference optical axis, and
the function is represented by $$X=(S-(L \cdot \tan(\tan^{-1}(Ds/F))-Ds)) \cdot \tan(2 \cdot (\theta 0 + \theta(t)) + \tan^{-1}(Ds/F)) + (L \cdot \tan(\tan^{-1}(Ds/F))-Ds)/\tan(45-\theta 0 - \theta(t))$$

where S is a distance from the rotational axis to the projection surface, Ds is the third positional shift amount, $\theta 0$ is the shift angle, t is the emitting time of the first light beam emitted from the first light source, $\theta(t)$ is a rotational angle of the scanning mirror at the emitting time t from a rotational position of the scanning mirror when the scanning mirror is not driven, L is a distance between the rotational axis and the first light source in a direction parallel to the reference optical axis, F is a distance between the collimator lens and the first light source in the direction parallel to the reference optical axis, and X is the irradiation position on the projection surface in the scanning direction irradiated by the first light beam emitted at the emitting time t.

5. The image projection device of claim 4, wherein the shift angle $\theta 0$ is zero.

6. The image projection device of claim 5, wherein:
the light source unit includes a second light source for emitting a second light beam different in wavelength from the first light beam,
the scanning mirror unit reflects the second light beam and projects an image on the projection surface by rotating the scanning mirror about the rotational axis to scan the second light beam.

7. The image projection device of claim 2, wherein, as viewed from the rotational axis direction:
the scanning mirror scans the first light beam over the projection surface in a scanning direction parallel to the reference optical axis,
a reference angle is 45 degrees, the reference angle being an angle formed by a normal to the scanning mirror at the reference rotational position and the reference optical axis, and
the function is represented by $$X=(S-D) \cdot \tan(2 \cdot (\theta 0 + \theta(t))) + D/\tan(45-\theta 0 - \theta(t))$$

where S is a distance from the rotational axis to the projection surface, D is the second positional shift amount, $\theta 0$ is the shift angle, t is the emitting time of the first light beam from the first light source, $\theta(t)$ is a rotational angle of the scanning mirror at the emitting time t from a rotational position of the scanning mirror when the scanning mirror is not driven, and X is the irradiation position on the projection surface in the scanning direction irradiated by the first light beam emitted at the emitting time t.

8. The image projection device of claim 7, wherein the shift angle $\theta 0$ is zero.

9. The image projection device of claim 8, wherein:
the light source unit includes a second light source for emitting a second light beam different in wavelength from the first light beam,
the scanning mirror unit reflects the second light beam and projects an image on the projection surface by rotating the scanning mirror about the rotational axis to scan the second light beam.

10. The image projection device of claim 7, wherein:
the light source unit includes a second light source for emitting a second light beam different in wavelength from the first light beam,
the scanning mirror unit reflects the second light beam and projects an image on the projection surface by rotating the scanning mirror about the rotational axis to scan the second light beam.

11. The image projection device of claim 10, further comprising an adjustment unit for adjusting a parameter value as a fourth positional shift amount when the controller determines the emitting time according to the function, the fourth positional shift amount being a fifth positional shift amount that is a shift amount of a position of the second light beam incident on the scanning mirror or a sixth positional shift amount that is a shift amount of a position of the second light source relative to the reference optical axis,
wherein the adjustment unit adjusts the parameter value so that an irradiation position on the projection surface irradiated by the light beam emitted from the second light source coincides with an irradiation position on the projection surface irradiated by the light beam emitted from the first light source.

12. The image projection device of claim 3, wherein:
the light source unit includes a second light source for emitting a second light beam different in wavelength from the first light beam,
the scanning mirror unit reflects the second light beam and projects an image on the projection surface by rotating the scanning mirror about the rotational axis to scan the second light beam.

13. The image projection device of claim 12, further comprising an adjustment unit for adjusting a parameter value as a fourth positional shift amount when the controller determines the emitting time according to the function, the fourth positional shift amount being a fifth positional shift amount that is a shift amount of a position of the second light beam incident on the scanning mirror or a sixth positional shift amount that is a shift amount of a position of the second light source relative to the reference optical axis,
wherein the adjustment unit adjusts the parameter value so that an irradiation position on the projection surface irradiated by the light beam emitted from the second light source coincides with an irradiation position on the projection surface irradiated by the light beam emitted from the first light source.

14. The image projection device of claim 4, wherein:
the light source unit includes a second light source for emitting a second light beam different in wavelength from the first light beam,
the scanning mirror unit reflects the second light beam and projects an image on the projection surface by rotating the scanning mirror about the rotational axis to scan the second light beam.

15. The image projection device of claim 1, wherein:
the light source unit includes a second light source for emitting a second light beam different in wavelength from the first light beam,
the scanning mirror unit reflects the second light beam and projects an image on the projection surface by rotating the scanning mirror about the rotational axis to scan the second light beam.

16. The image projection device of claim 15, further comprising an adjustment unit for adjusting a parameter value as a fourth positional shift amount when the controller determines the emitting time according to the function, the fourth positional shift amount being a fifth positional shift amount that is a shift amount of a position of the second light beam incident on the scanning mirror or a sixth positional shift amount that is a shift amount of a position of the second light source relative to the reference optical axis,
- wherein the adjustment unit adjusts the parameter value so that an irradiation position on the projection surface irradiated by the light beam emitted from the second light source coincides with an irradiation position on the projection surface irradiated by the light beam emitted from the first light source.

17. The image projection device of claim 16, wherein:
- the scanning mirror unit scans the first light beam over the projection surface in a first scanning direction and a second scanning direction perpendicular to each other and scans the second light beam in the first scanning direction and the second scanning direction, and
- the controller shifts an irradiation position on the projection surface irradiated by the second light beam in the first scanning direction in accordance with change in the fourth positional shift amount.

18. The image projection device of claim 17, wherein an adjustment image is used in shifting the irradiation position on the projection surface irradiated by the second light beam, the adjustment image including a linear pattern extending in the second scanning direction.

19. An adjustment method comprising:
- measuring an amount and a direction of a shift of a second adjustment image formed on a projection surface by a second light beam emitted from a second light source relative to a first adjustment image formed on the projection surface by a first light beam emitted from a first light source;
- determining, based on the amount of the shift, whether the shift is present;
- determining, based on the amount and the direction of the shift, a new value as a parameter value for the second light source so that the amount of the shift is reduced;
- changing the parameter value for the second light source to the new value; and
- displaying the second adjustment image by using the parameter value for the second light source that has been changed to the new value.

20. The adjustment method of claim 19, wherein the second adjustment image is a linear pattern perpendicular to a direction in which the second light beam is scanned over the projection surface.

* * * * *